(12) United States Patent
Bishel et al.

(10) Patent No.: US 10,705,533 B1
(45) Date of Patent: *Jul. 7, 2020

(54) AUTONOMOUS LAWNMOWER

(76) Inventors: Richard Anthony Bishel, Beaverton, OR (US); G. Gregory Wilson, Burlington, WA (US)

( * ) Notice: Subject to any disclaimer, the term of this patent is extended or adjusted under 35 U.S.C. 154(b) by 1277 days.

This patent is subject to a terminal disclaimer.

(21) Appl. No.: 12/228,969

(22) Filed: Aug. 18, 2008

Related U.S. Application Data

(63) Continuation-in-part of application No. 11/142,600, filed on May 31, 2005, now Pat. No. 7,412,905.

(51) Int. Cl.
*G05D 1/02* (2020.01)
*G01S 11/00* (2006.01)
(Continued)

(52) U.S. Cl.
CPC ......... *G05D 1/0231* (2013.01); *G05D 1/0255* (2013.01)

(58) Field of Classification Search
CPC ................ G01C 21/00; H04L 67/10; G05D 2201/0208; G05D 1/0219; G05D 1/0255; G05D 1/0265; G05D 1/0278; G05D 1/0227; G05D 1/0234; G05D 1/0242; G05D 1/0259; G05D 1/0261; G05D 1/0263; G05D 1/0274; G05D 2201/0201; G05D 2201/0216; G05D 1/0088; G05D 1/0221; G05D 1/0225; G05D 1/0231; G05D 1/0272; G05D 1/028; G05D 2201/0202; G05D 2201/0203; G05D 2201/0209; G05D 2201/0215; A01D 34/008; A01D 2101/00;
(Continued)

(56) References Cited

U.S. PATENT DOCUMENTS 2,751,030 A * 6/1956 Null .............................. 180/169
3,425,197 A * 2/1969 Kita ........................... 56/10.2 F
(Continued)

*Primary Examiner* — Tuan C To
*Assistant Examiner* — Paul A Castro

(57) ABSTRACT

A semi-autonomous or autonomous mowing vehicle with a sensor that detects the boundary between a first, relatively higher surface, such as the un-mowed vegetation and a second, a relatively lower surface, such as the mowed vegetation, and a controller for steering the semi-autonomous or autonomous vehicle along detected boundary. The detected boundary is based on height differential between the two surfaces and two methods are discussed. For one, the boundary between the two surfaces is detected using a plurality of non-contact distance measuring sensors aligned in same direction, and processes these distance measuring sensors for determining the distance sensors that measure said first relatively higher surface and the distance sensors that measure the second relatively lower surface. For two, the boundary between the two surfaces is detected using a plurality of rotatable contact members on a rotating shaft and a plurality of slip clutches, each slip clutch associated with each contact member coupling the shaft to the contact member in rotating engagement, and processes the internal sensors for detecting impeded rotation of said contact members do to slippage of said clutches in response to contact with said first surface, relatively higher surface, but not contact with said second surface, a relatively lower surface.

17 Claims, 36 Drawing Sheets

Figure 1:
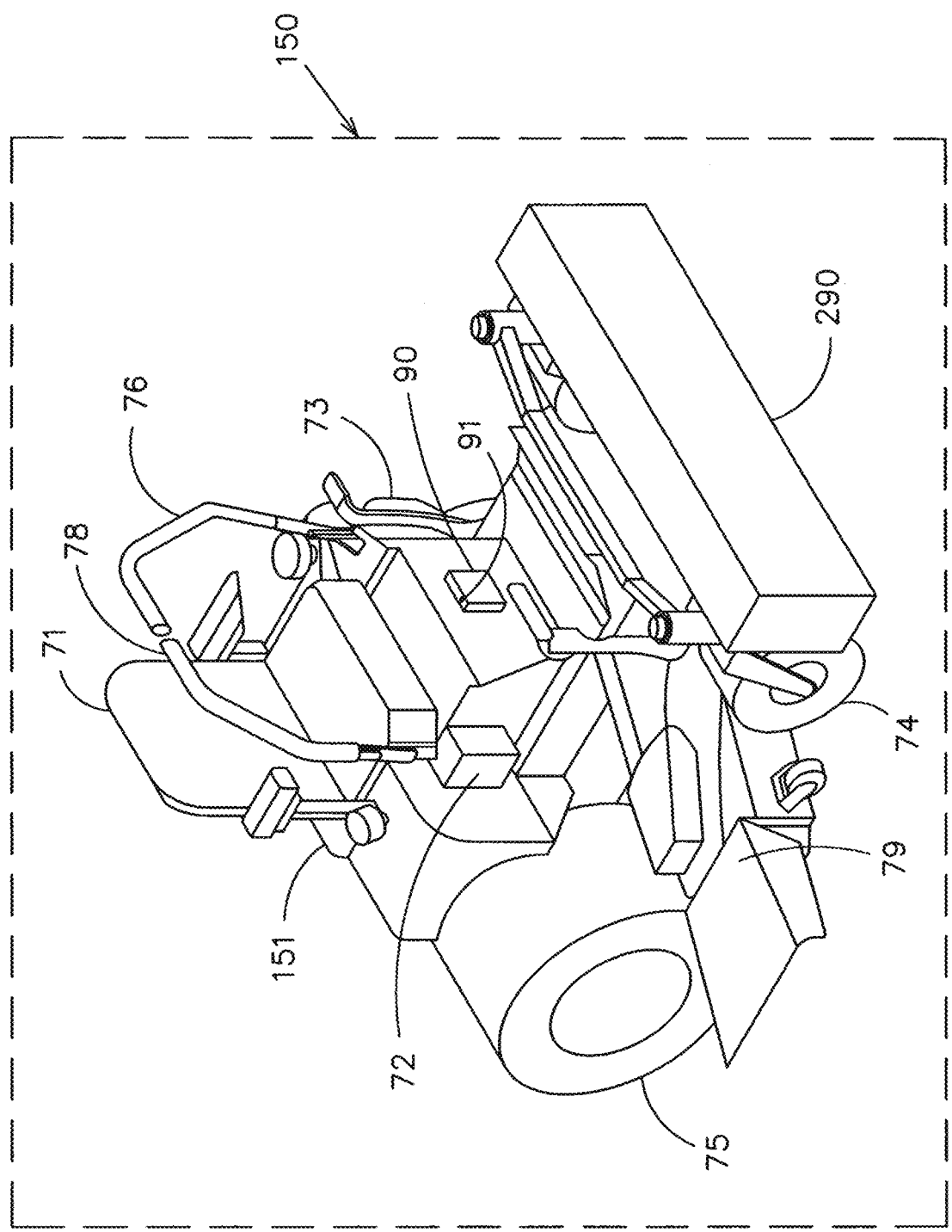

(51) Int. Cl.
*G01S 13/00* (2006.01)
*G01S 15/00* (2020.01)

(58) Field of Classification Search
CPC .... A01D 34/001; A01D 34/006; A01D 34/14; A01D 34/64; A01D 34/78; A01D 41/127; A01D 41/1278; A01D 69/02; A01B 69/007; A01B 69/008; A01B 69/001; A01B 79/005
USPC ............... 56/10.2 D, 10.2 E, 10.2 F, 10.2 A; 73/862; 192/125 R, 125 E; 180/401
See application file for complete search history.

(56) References Cited

U.S. PATENT DOCUMENTS

| | | | |
|---|---|---|---|
| 3,550,714 A | 12/1970 | Bellinger | |
| 3,570,227 A | 3/1971 | Bellinger | |
| 3,650,097 A | 3/1972 | Nokes | |
| 3,789,939 A | 2/1974 | Geislinger | |
| 3,924,389 A * | 12/1975 | Kita | 56/10.2 A |
| 4,077,488 A * | 3/1978 | Bennett et al. | 180/169 |
| 4,133,404 A * | 1/1979 | Griffin | A01D 34/008 180/169 |
| 4,180,964 A | 1/1980 | Pansire | |
| 4,184,559 A | 1/1980 | Rass | |
| 4,318,266 A | 3/1982 | Taube | |
| 4,482,960 A | 11/1984 | Pryor | |
| 4,500,970 A | 2/1985 | Daemmer | |
| 4,537,271 A * | 8/1985 | Ito et al. | 180/401 |
| 4,545,453 A | 10/1985 | Yoshimura et al. | |
| 4,573,547 A | 3/1986 | Yoshimura et al. | |
| 4,603,753 A * | 8/1986 | Yoshimura et al. | 180/401 |
| 4,638,445 A | 1/1987 | Mattaboni | |
| 4,694,639 A | 9/1987 | Chen et al. | |
| 4,777,785 A | 10/1988 | Rafaels | |
| 4,831,813 A | 5/1989 | Jona et al. | |
| 4,887,415 A | 12/1989 | Martin | |
| 4,962,453 A | 10/1990 | Pong et al. | |
| 5,007,234 A | 4/1991 | Shurman et al. | |
| 5,155,775 A | 10/1992 | Brown | |
| 5,163,273 A | 11/1992 | Wojtkowshi et al. | |
| 5,170,352 A | 12/1992 | McTamaney et al. | |
| 5,189,612 A | 2/1993 | Lemercier et al. | |
| 5,204,814 A | 4/1993 | Noonan et al. | |
| 5,351,778 A | 10/1994 | Shigemi et al. | |
| 5,444,965 A | 8/1995 | Colens | |
| 5,507,137 A | 4/1996 | Norris | |
| 5,525,882 A | 6/1996 | Asaka et al. | |
| 5,528,888 A * | 6/1996 | Miyamoto et al. | 56/10.2 F |
| 5,581,985 A * | 12/1996 | Secosky | 56/10.3 |
| 5,911,670 A | 6/1999 | Angott et al. | |
| 5,956,250 A | 9/1999 | Gudat et al. | |
| 5,974,347 A | 10/1999 | Nelson | |
| 6,255,793 B1 | 7/2001 | Peless et al. | |
| 6,321,515 B1 | 11/2001 | Colens | |
| 6,389,785 B1 * | 5/2002 | Diekhans | A01B 69/001 172/4.5 |
| 6,417,641 B2 | 7/2002 | Peless et al. | |
| 6,493,613 B2 | 12/2002 | Peless et al. | |
| 6,696,965 B2 * | 2/2004 | Stout et al. | 340/617 |
| 6,850,024 B2 | 2/2005 | Peless et al. | |
| 6,984,952 B2 * | 1/2006 | Peless et al. | 318/580 |
| 7,103,457 B2 | 9/2006 | Dean | |
| 7,117,660 B1 | 10/2006 | Colens | |
| 7,155,309 B2 | 12/2006 | Peless et al. | |
| 7,228,214 B2 | 6/2007 | Flann et al. | |
| 7,362,439 B2 | 4/2008 | Franzen et al. | |
| 7,412,905 B1 * | 8/2008 | Bishel | 73/862 |
| 7,911,616 B2 * | 3/2011 | Franzen et al. | 356/445 |
| 7,916,898 B2 * | 3/2011 | Anderson | 382/104 |
| 8,275,506 B1 | 9/2012 | Bishel | |
| 2005/0028505 A1 * | 2/2005 | Schumacher | A01D 34/14 56/296 |
| 2006/0059880 A1 | 3/2006 | Angott | |
| 2008/0039974 A1 * | 2/2008 | Sandin et al. | 700/258 |
| 2008/0039991 A1 | 2/2008 | May et al. | |

* cited by examiner

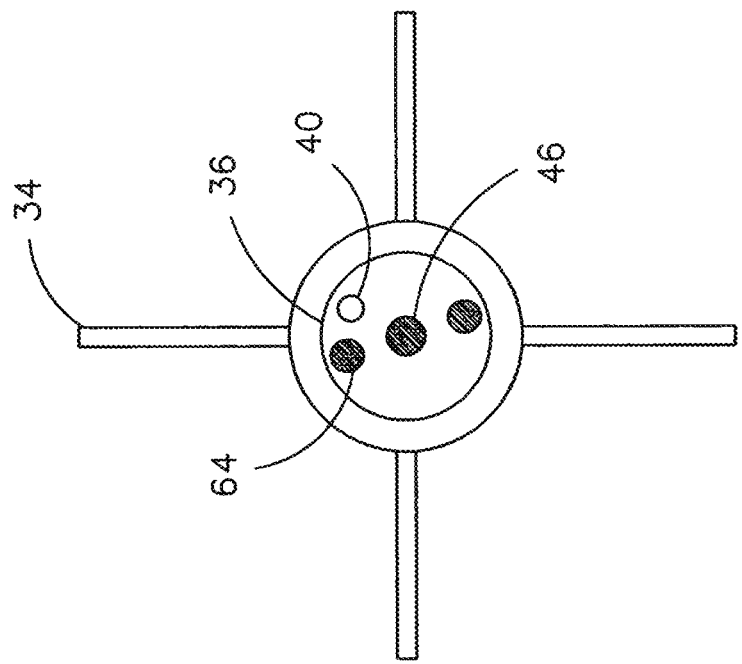
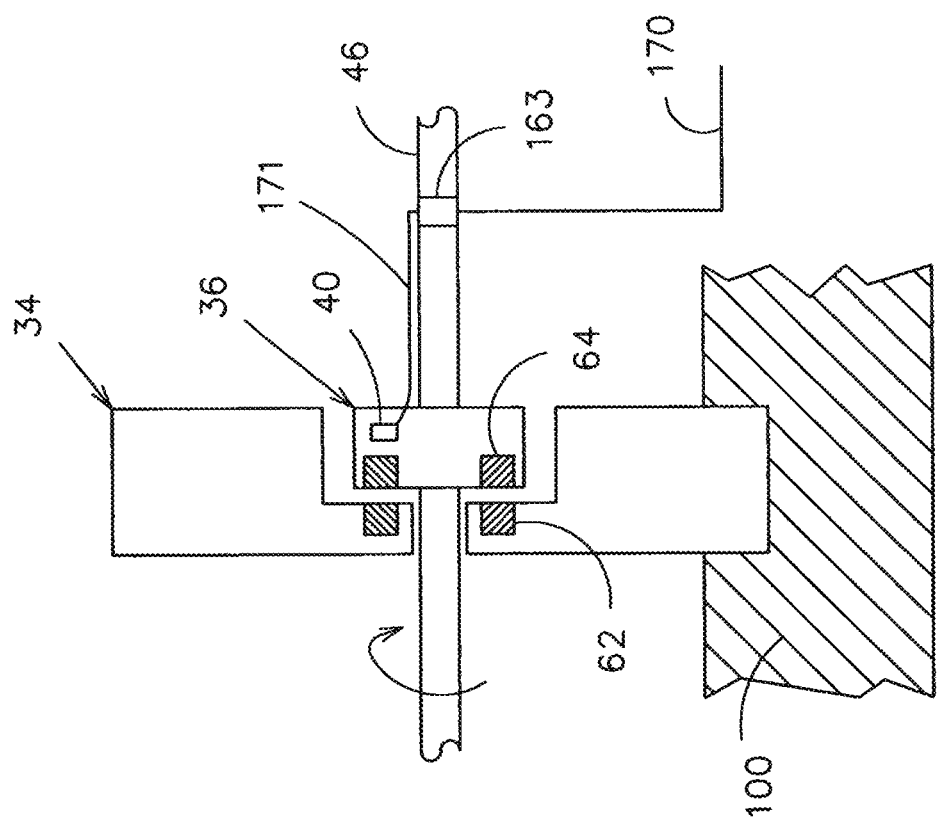
FIG. 4B
FIG. 4A

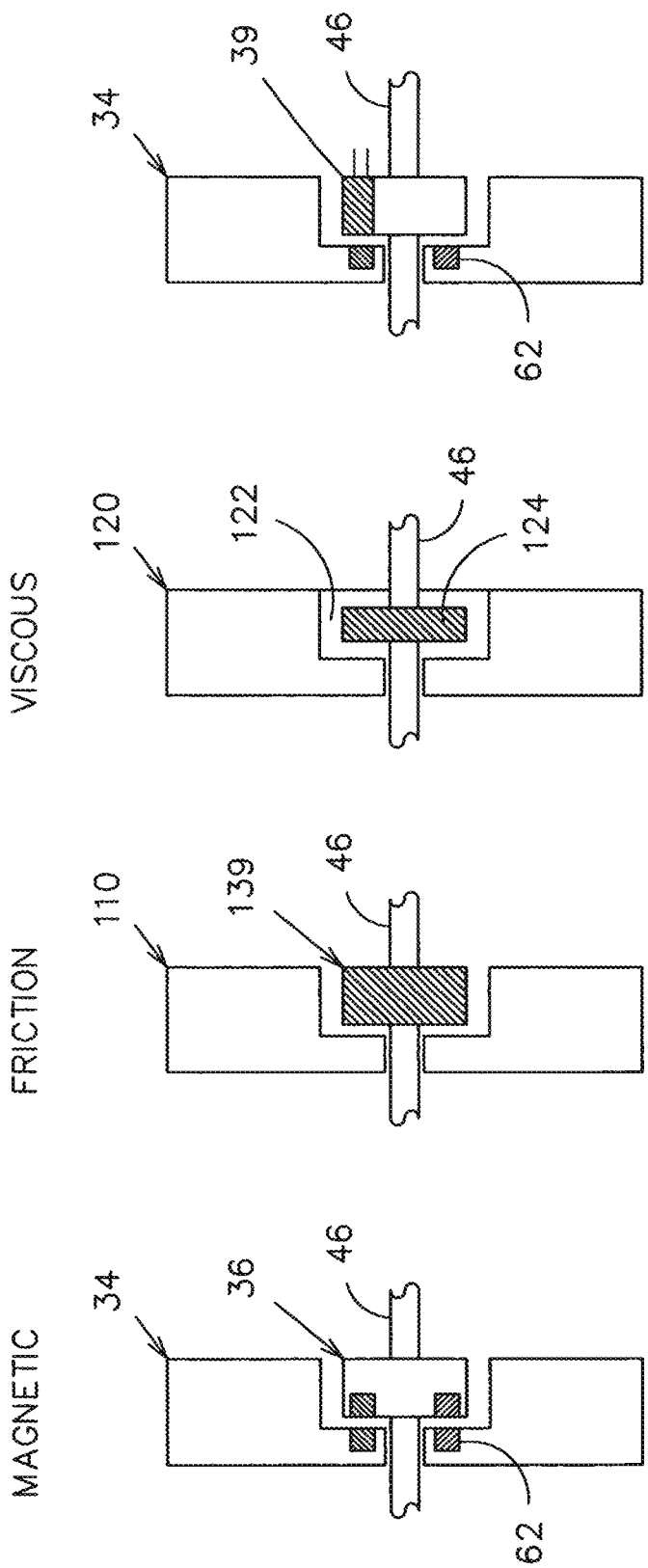

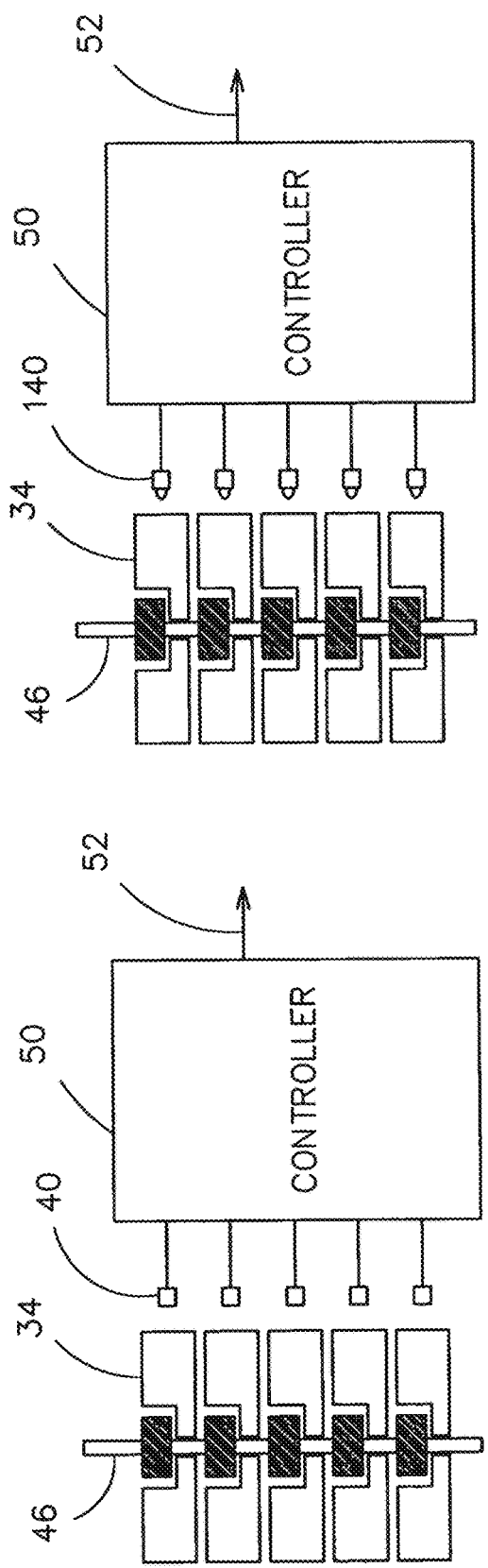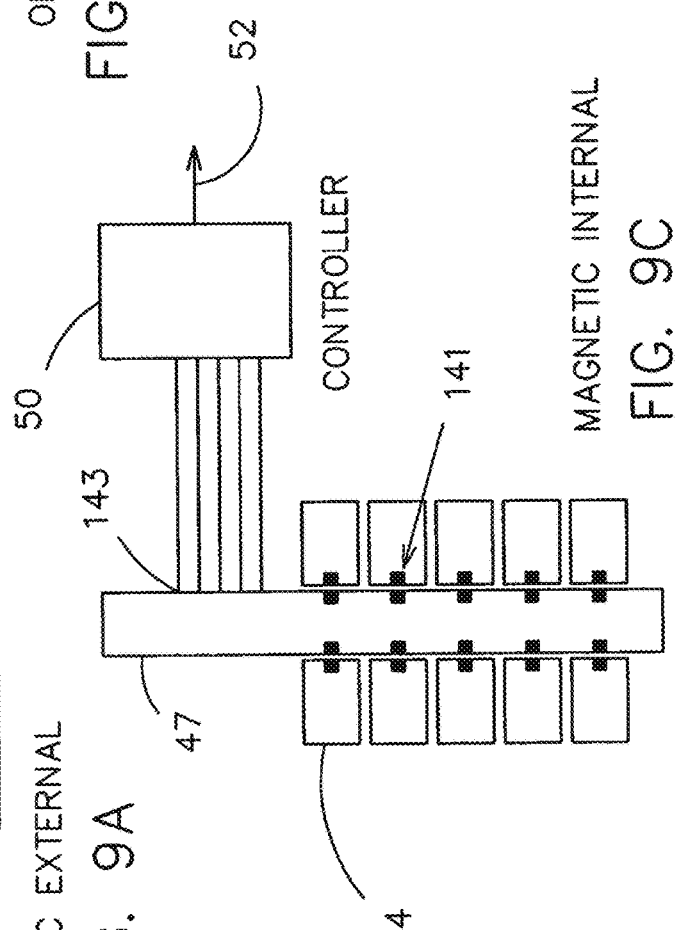

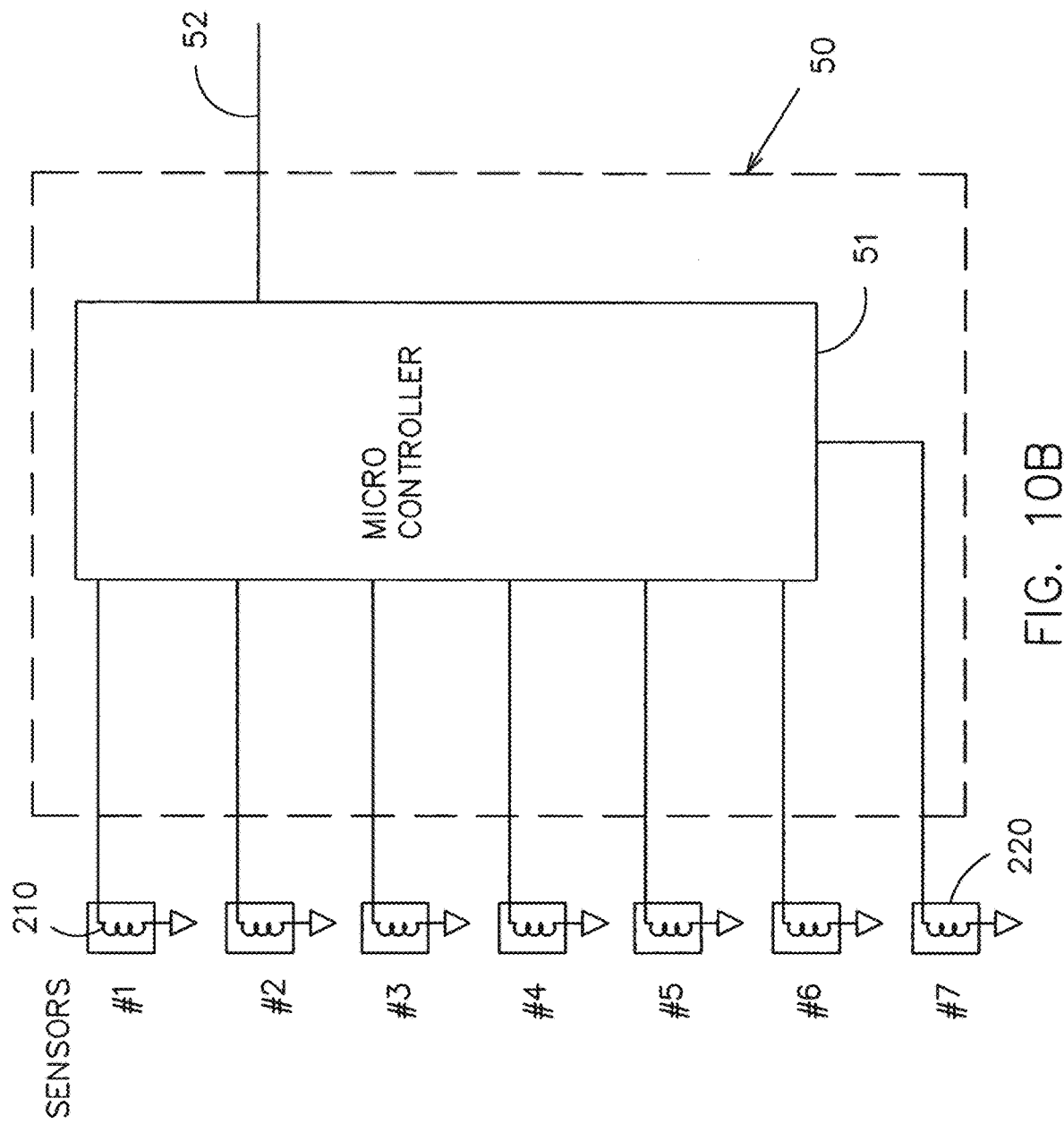

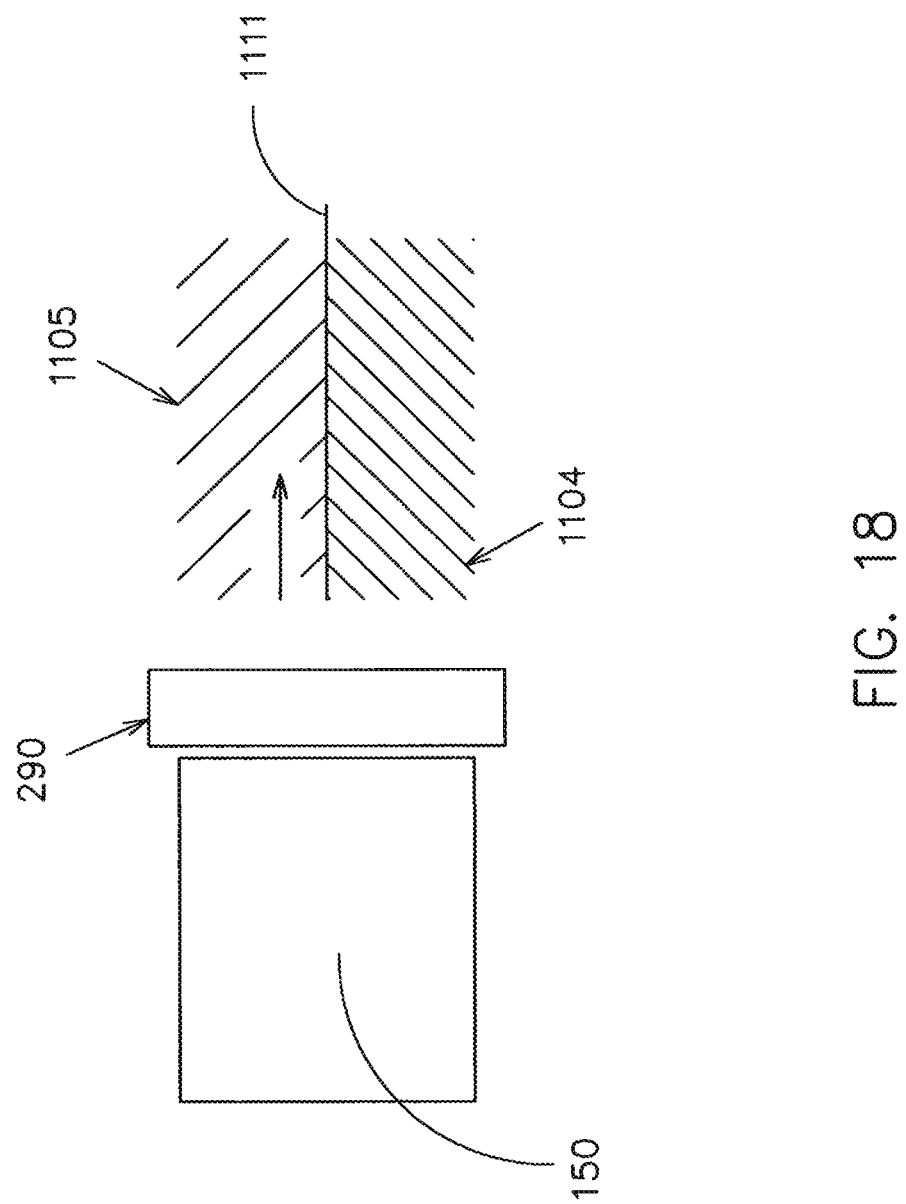

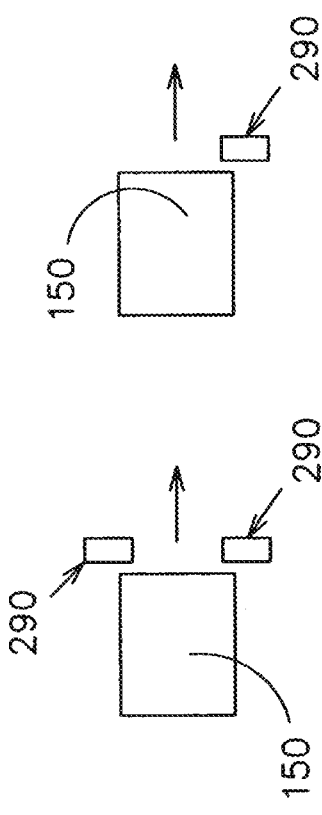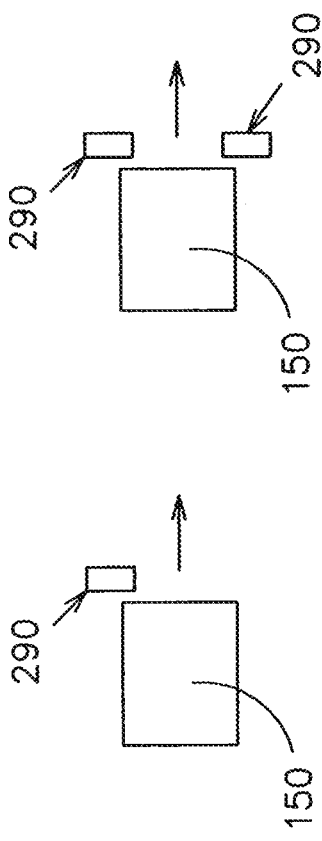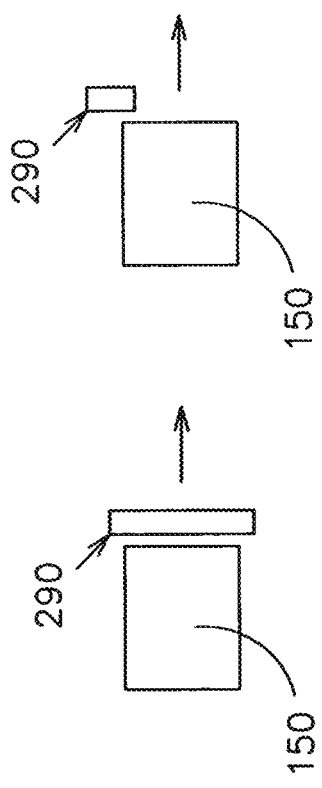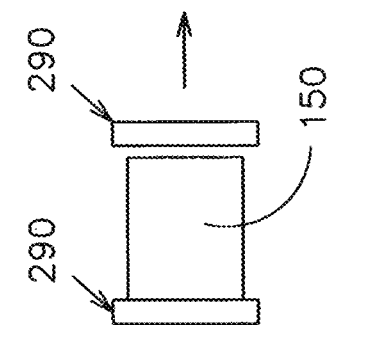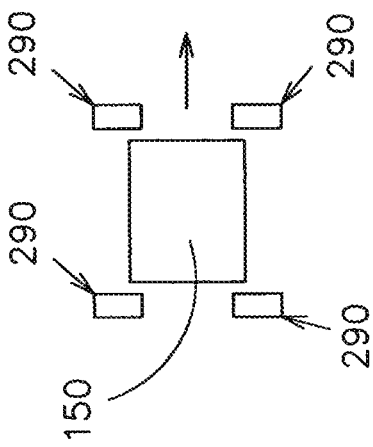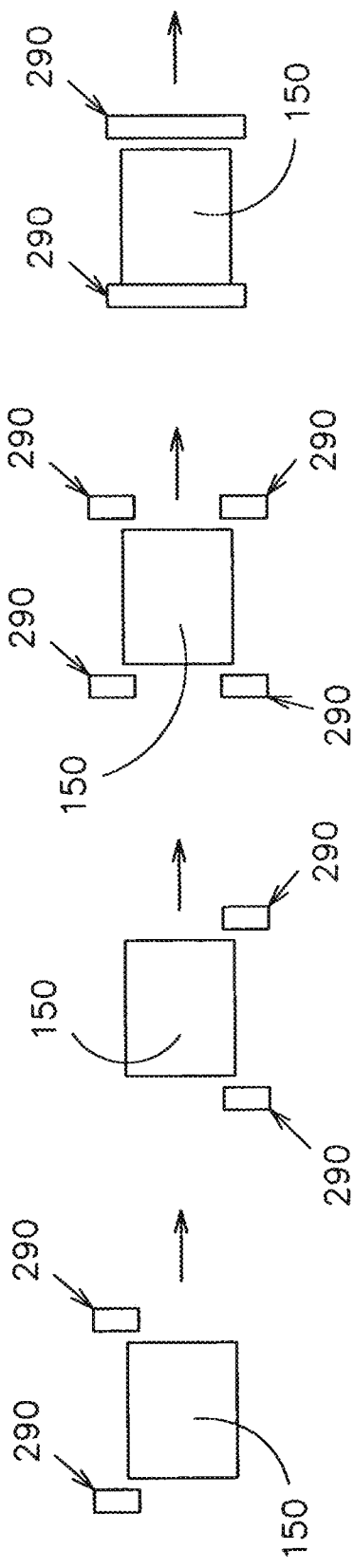

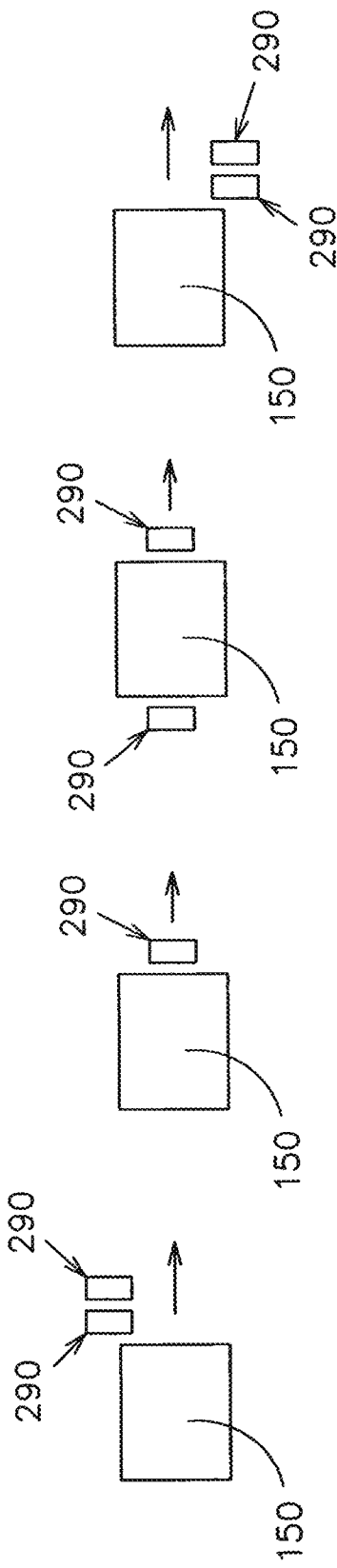
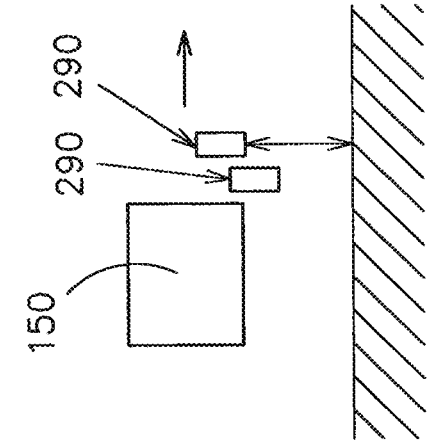

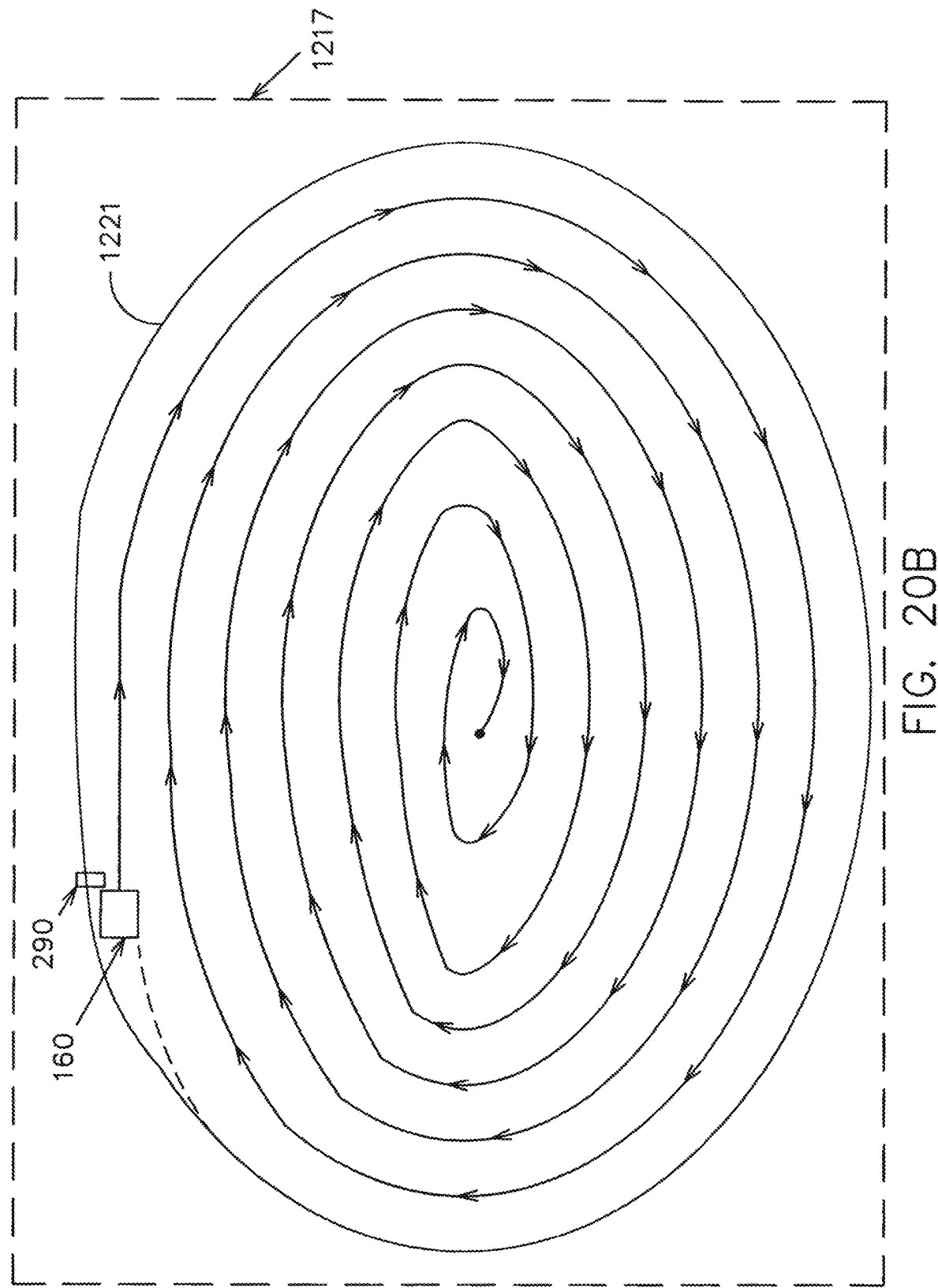

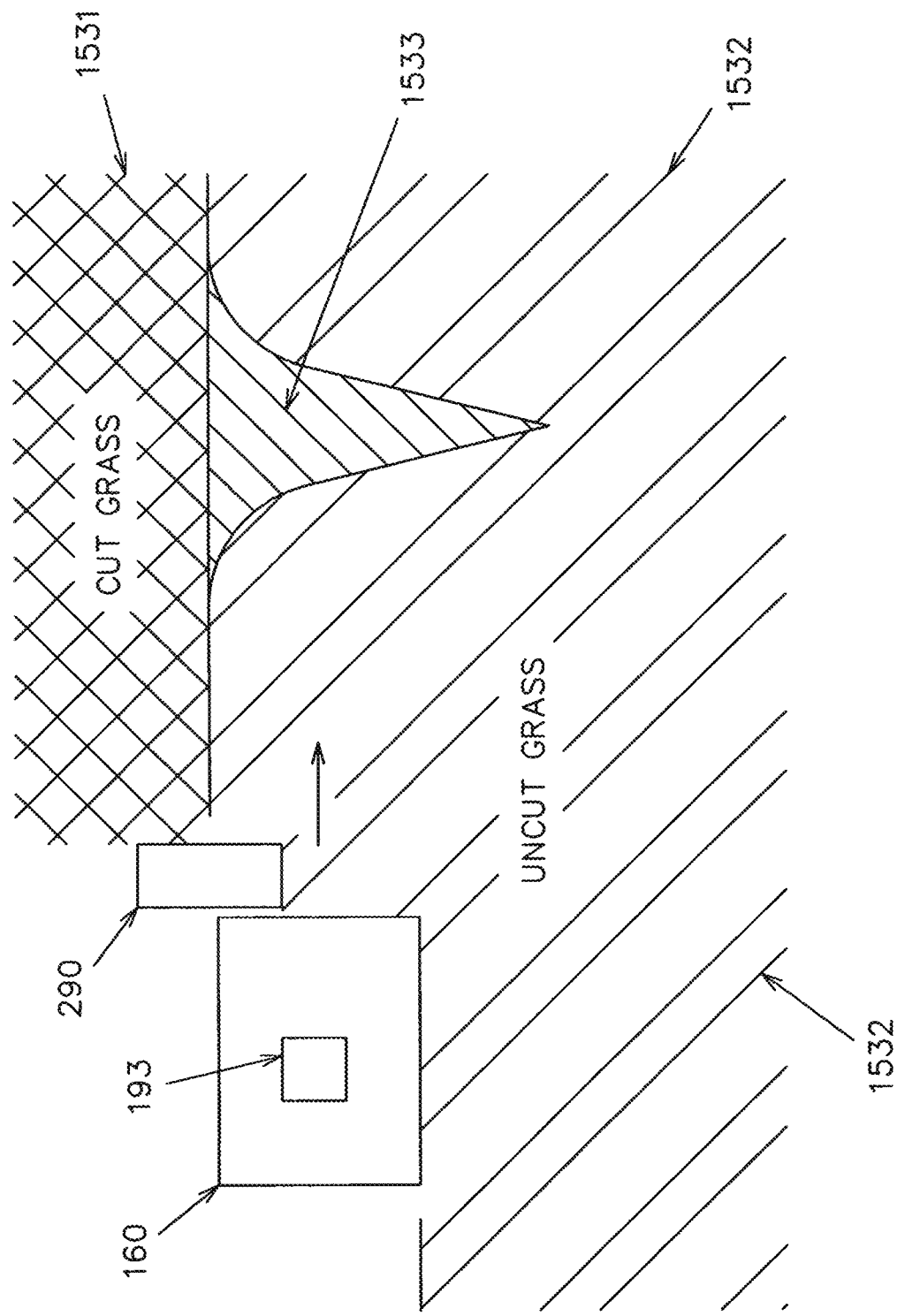

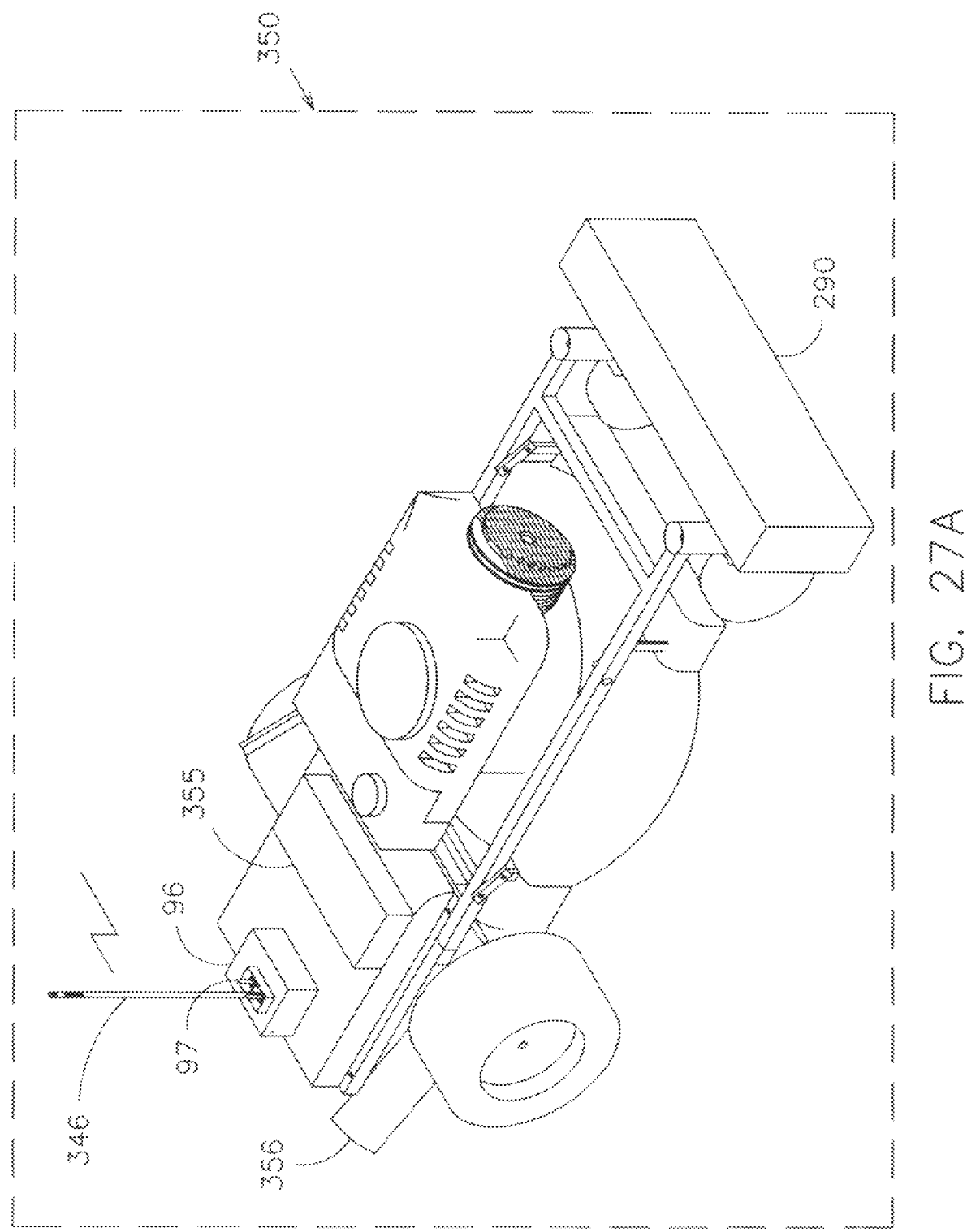

AUTONOMOUS LAWNMOWER

RELATED APPLICATIONS

This is a continuation-in-part of application Ser. No. 11/142,600, filed on May 31, 2005 now U.S. Pat. No. 7,412,905.

FIELD OF INVENTION

The present invention relates to an apparatus, a method, and a system for guiding or controlling a semi-autonomous or autonomous vehicle especially an autonomous lawnmower.

BACKGROUND

Robotic lawnmowers, autonomous lawn mowers, and self-propelled lawn mowers are currently available and are known in prior art. The current commercially available autonomous lawn mowers made by companies such as Belrobotics, Friendly Robotics, and Kyoda America use a continuous guide conductor boundary around the confined area. The autonomous lawn mowers randomly mowed around the confined area. This art is described in early patents such as U.S. Pat. Nos. 3,550,714 and 3,570,227 by Bellinger. More recently, Peless et al. U.S. Pat. Nos. 6,255,793 B1, 6,417,641 B2, 6,850,024 B2, and 7,155,309 B2 discusses this technology. These autonomous lawn mowers take time to mow the entire area completely and may miss certain sections of the lawn every operation. They require installation, excitation, and maintenance of conductor around the desired area. Also, Colens U.S. Pat. No. 6,321,515 B1 discloses a similar system where the buried wire restricts the mower to operate randomly within a certain area.

Some autonomous mowers use a pre-programmed or pre-recorded path for guidance such as Nokes U.S. Pat. No. 3,650,097, Geslinger U.S. Pat. No. 3,789,939, and Noonan et al. U.S. Pat. No. 5,204,814. These systems are unsatisfactory because of tire slippage, etc. Some RTK GPS-based systems have been developed and are outline in U.S. Pat. No. 5,956,250 by Gudat et al. These are very expensive systems and require open space areas. Trees blocking the signals may cause concerns.

Tracking the cut/uncut vegetation border has also been tried by various inventors. U.S. Pat. Nos. 3,425,197 and 3,924,387, both to Kita, uses electrical conductors touching the uncut grass. Martin U.S. Pat. No. 4,887,415 uses touch grass detection switches on the rear of the mower frame to provide an indication of the relative position of the cut/uncut grass boundary. The vehicle needs to be moving for the touch sensor to detect the boundary. U.S. Pat. No. 5,528,888 by Miyamoto et al. describes a plurality of mechanical rocking members to detect the cut/uncut boundary. The vehicle also requires to be moving in order to determine the boundary. Likewise, U.S. Pat. No. 6,255,793 B1 by Peless et al. discloses using mechanical plates attached to potentiometers spaced far apart to determine an estimated boundary. Similarly as Miyamoto et al., the autonomous vehicle needs to be moving in order to determine the boundary.

An optical tracking system to detect the cut/uncut grass boundary is described in Griffin U.S. Pat. No. 4,133,404. Griffin shows a fluorescent light source directed at the grass and the reflection from the grass is detected by a plurality of optical sensors. These optical sensors measure the intensity of the light after it has been reflected by the grass. The position of the cut/uncut grass boundary is determined by measuring a different reflected light intensity for the cut grass than for the uncut grass. However, if the light intensity differential between the cut and uncut grass is not significantly, the system does not work well. Yoshimura et al. U.S. Pat. No. 4,573,547 describes a system that uses photosensors to detect cut/uncut boundary by the presence or absence of the grass. Since the width of the grass blade is small, the optical sensor does not reliably detect the cross sectional grass blade and the cut/uncut boundary. To overcome this limitation, the photosensor is integrated with an orientation sensor. U.S. Pat. No. 4,777,785 from Rafaels discusses a plurality of optical sensors to detect the presence or absence of grass. Like the Yoshimura et al. patent, since the width of grass blade is small, the optical sensor does not reliable detect the cross sectional grass blade and the cut/uncut boundary. The patent description describes ways of improving the situation. Also, the system requires a reference path to be mowed prior to start of process.

The prior art does not reliably detect the boundary between the cut/uncut vegetation or provide a reasonable cost system for autonomously mowing a field.

SUMMARY OF INVENTION

It is therefore a general object of the invention to overcome the disadvantages of the prior art form for detecting a boundary between a first, relatively higher surface, such as un-mowed vegetation, and a second, a relatively lower surface, such as mowed vegetation. In addition to detecting the boundary, it is further object of this invention to guide or control a semi-autonomous or autonomous vehicle along the detected boundary.

Another object of the invention is a boundary sensor that detects the boundary between the two surfaces uses a plurality of rotatable contact members on a rotating shaft and a plurality of slip clutches, each slip clutch associated with each contact member coupling the shaft to the contact member in rotating engagement, and processes the internal sensors for detecting impeded rotation of the contact members do to slippage of the clutches in response to contact with the first surface, relatively higher surface, but not contact with said second surface, a relatively lower surface.

Another object of the invention is a boundary sensor that detects the boundary between the two surfaces uses a plurality of non-contact distance measuring sensors aligned in same direction, and processes the number of distance measuring sensors that measure the first relatively higher surface versus the number of the distance measuring sensors that measure the second relatively lower surface to determine the boundary.

Another object of the invention is a semi-autonomous or autonomous mowing vehicle with a boundary sensor that detects the boundary between a first, relatively higher surface, such as the un-mowed vegetation and a second, a relatively lower surface, such as the mowed vegetation, and a controller for steering the semi-autonomous or autonomous vehicle along detected boundary.

Another object of the invention is a method for controlling the autonomous running of a vehicle having at least one cutting blade provided under the body of the vehicle for mowing a field, the method include the following steps: providing the vehicle with a plurality of non-contact distance measuring sensors aligned in same direction, processing the sensor information for determining the boundary between the distance sensors that measure a first relatively higher surface and the distance sensors that measure the a second relatively lower surface, and controlling the vehicle along detected boundary.

LIST OF FIGURES

Figure 2:
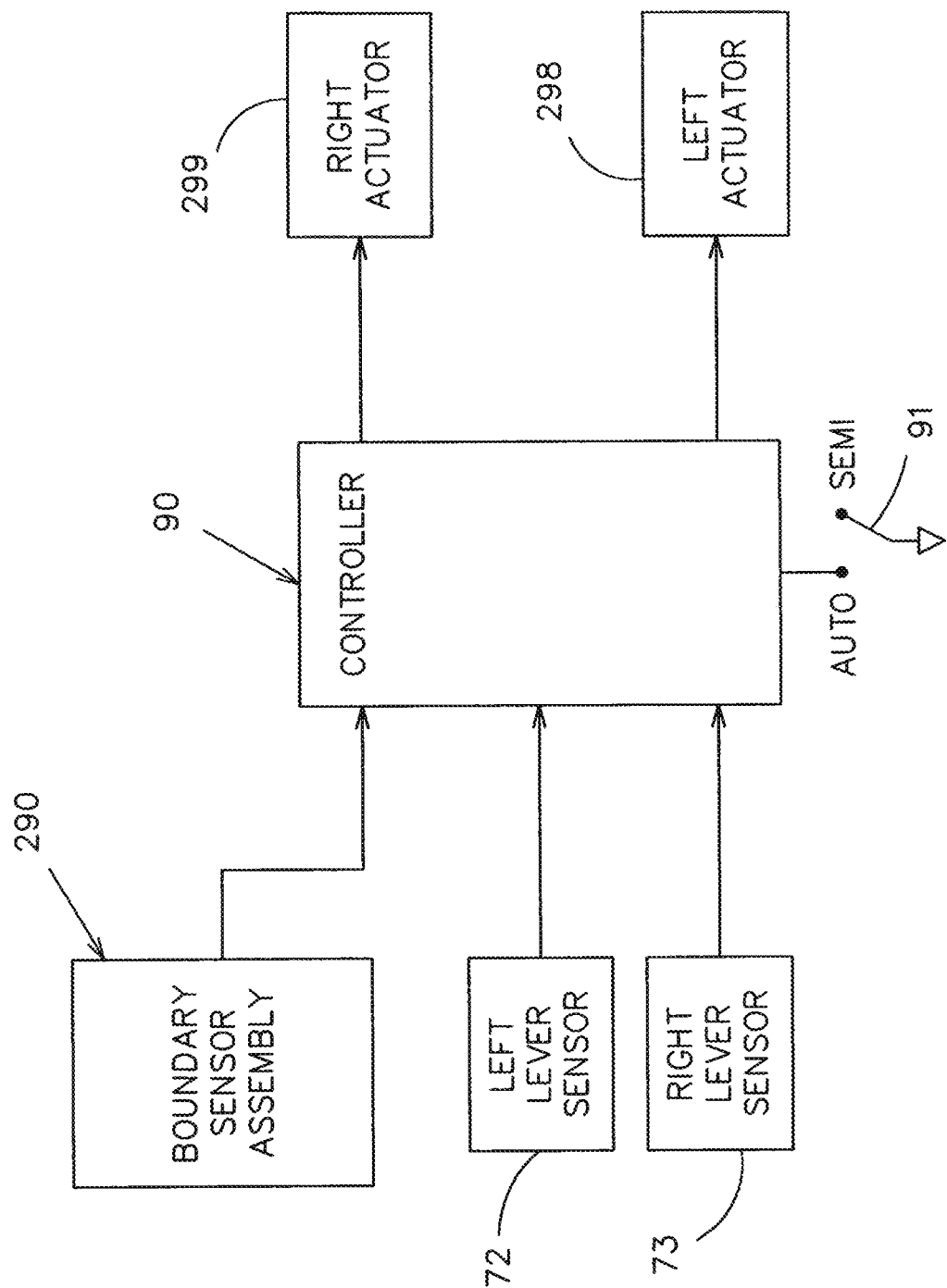
Figure 3A:
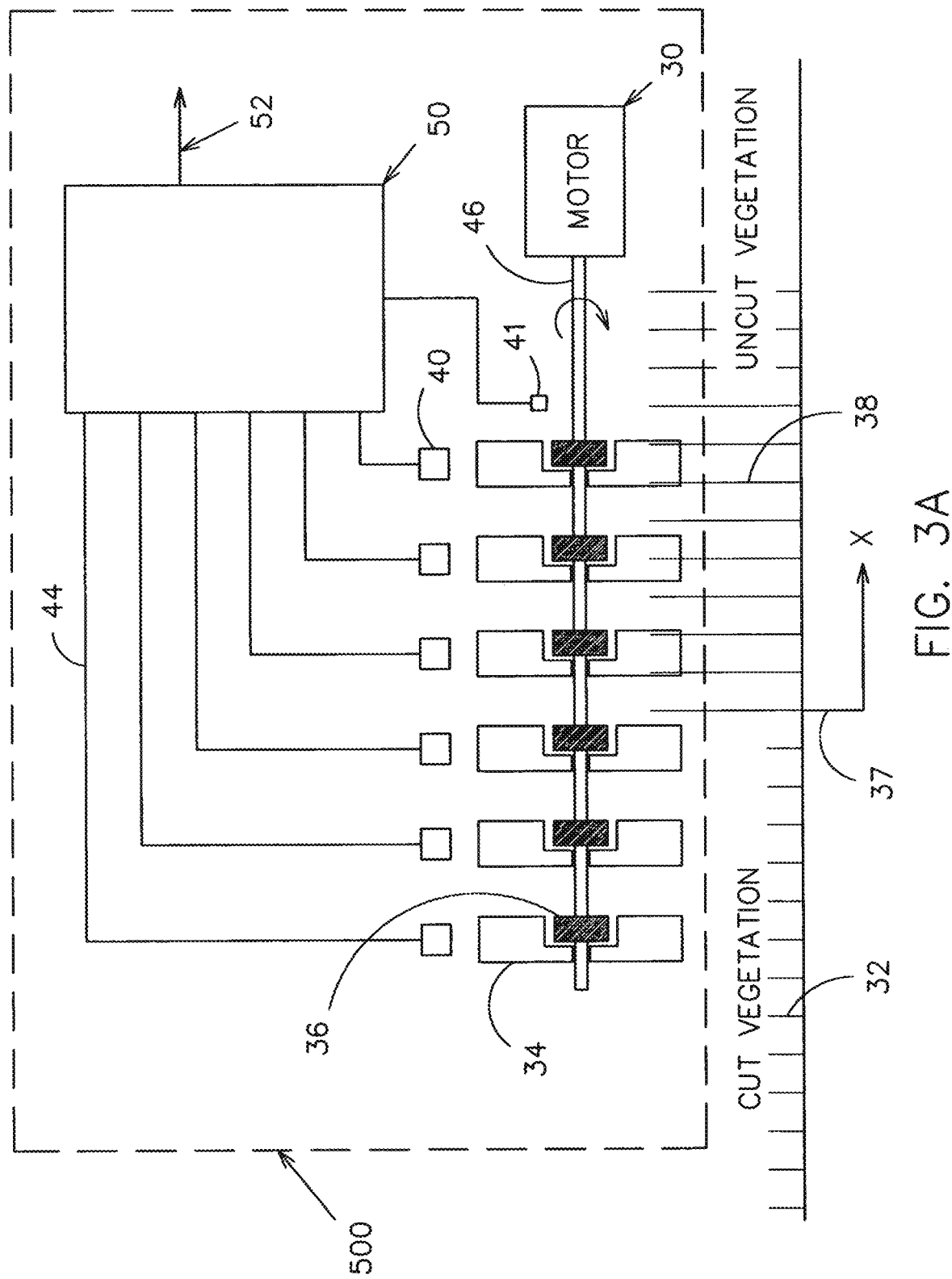
Figure 3B:
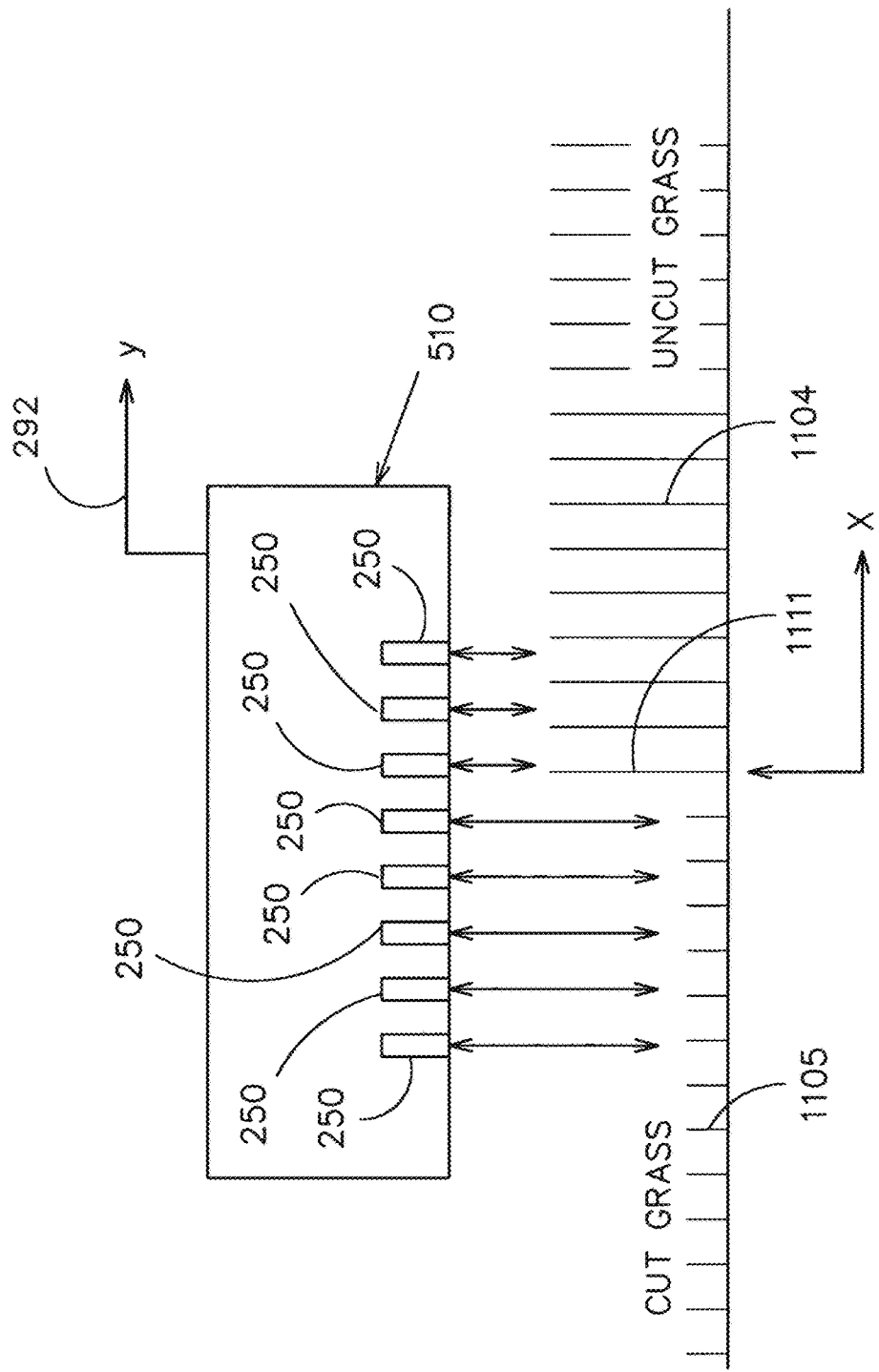
Figure 5B:
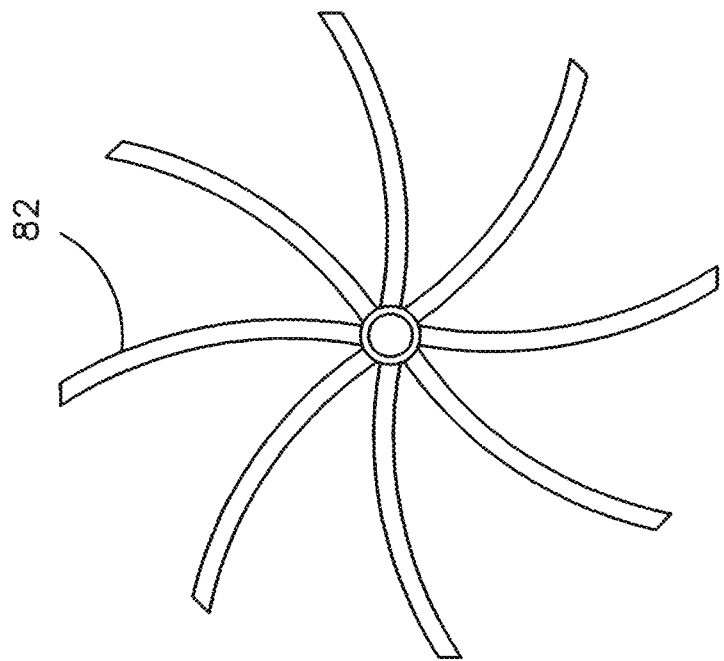
Figure 5A:
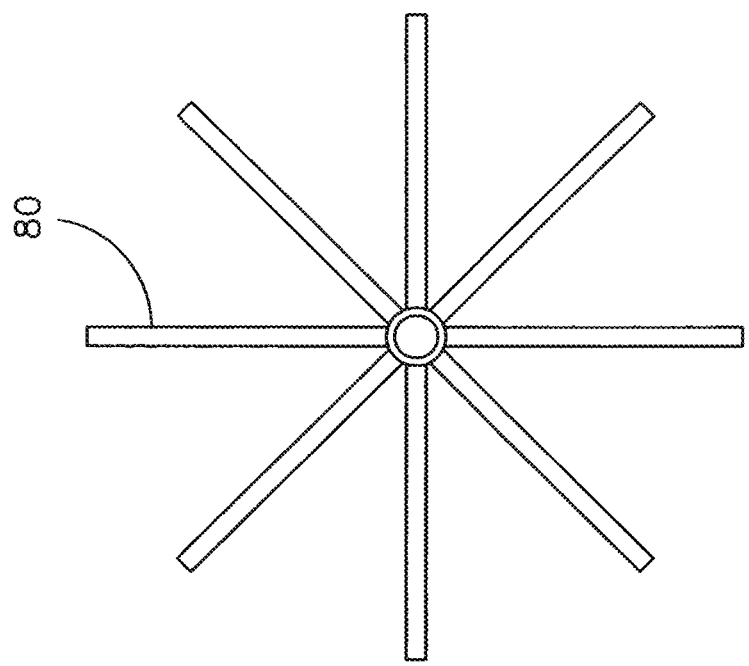
Figure 6A:
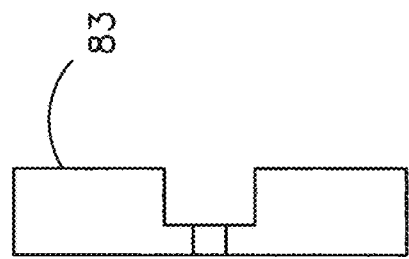
Figure 6B:
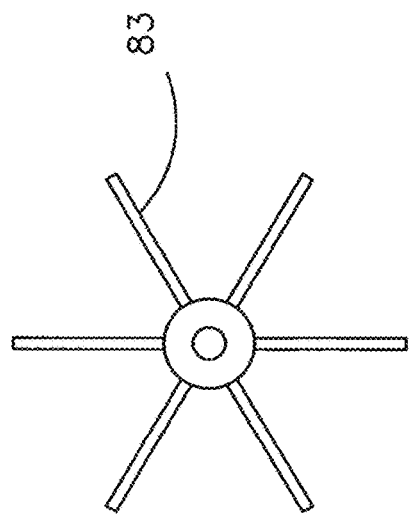
Figure 7A:
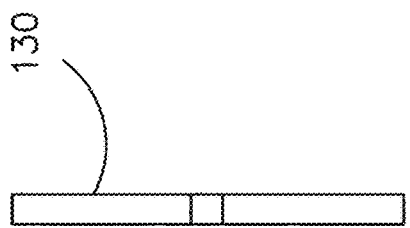
Figure 7B:
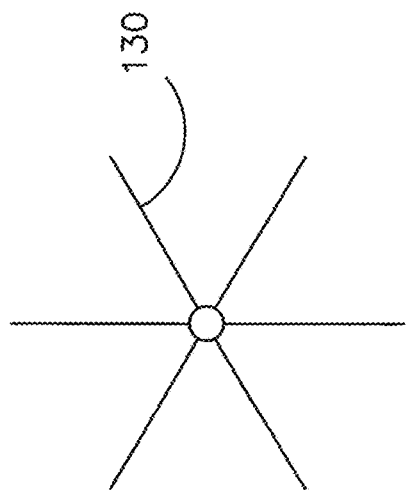
Figure 10A:
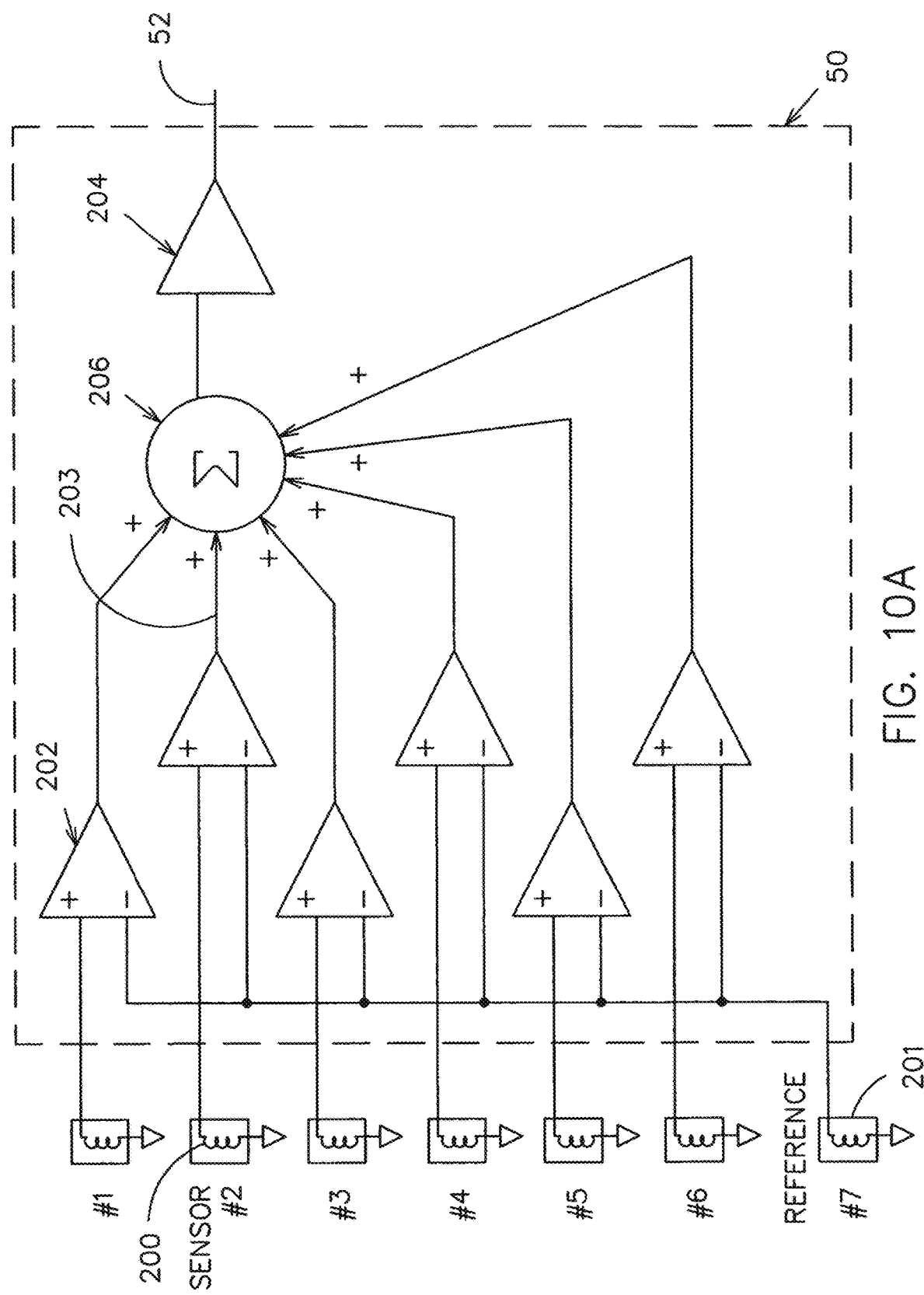
Figure 11:
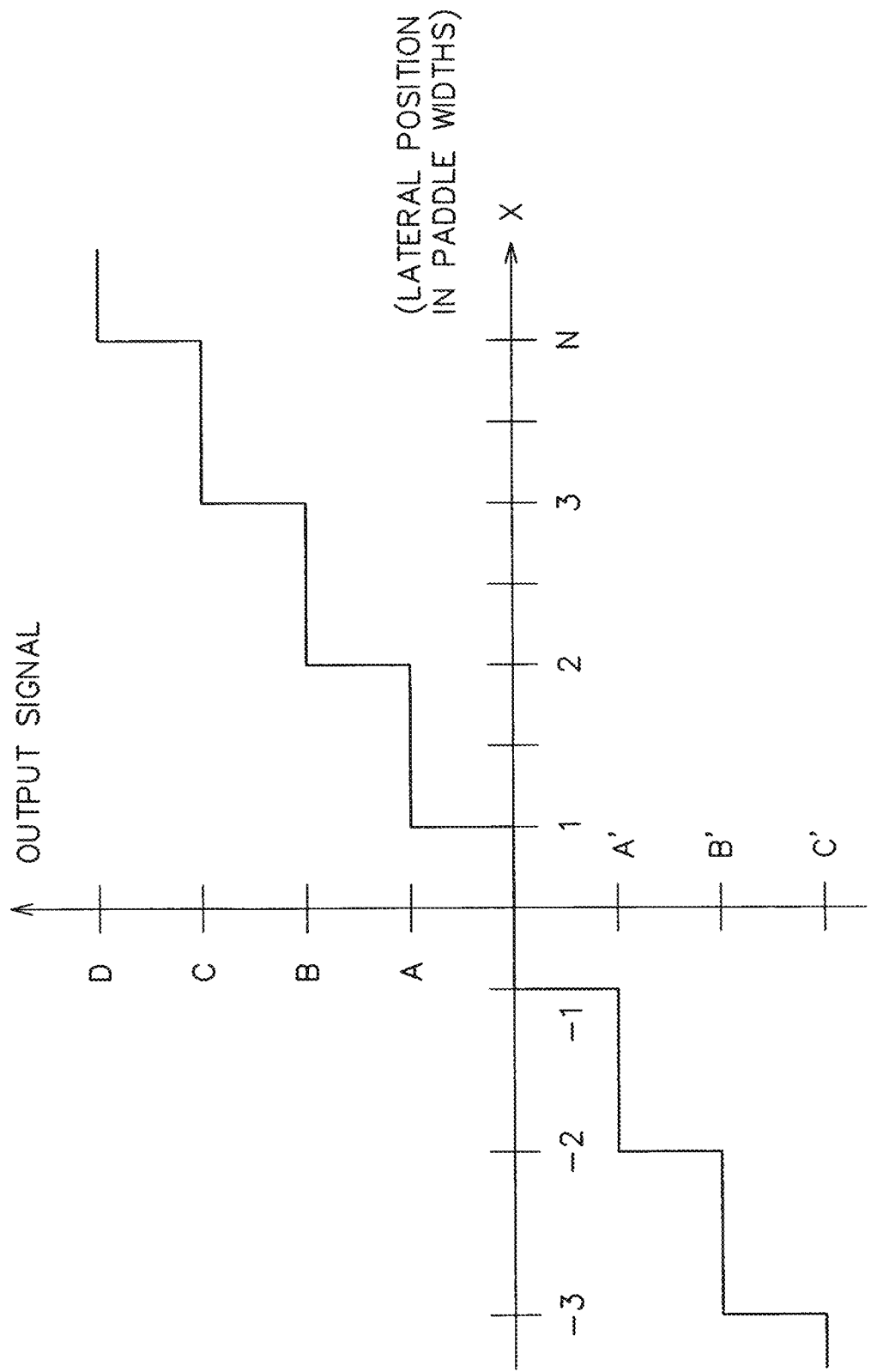
Figure 12:
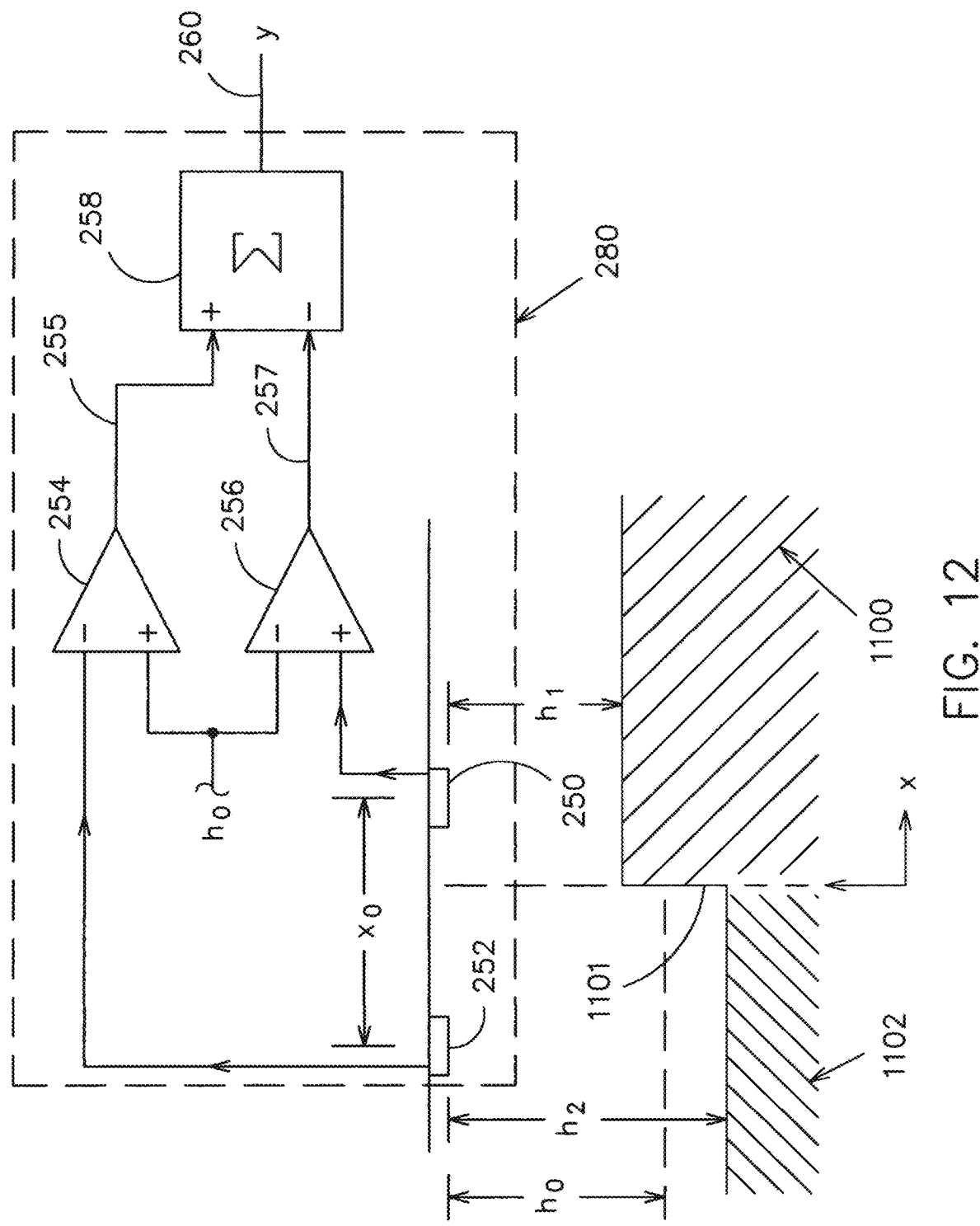
Figure 13:
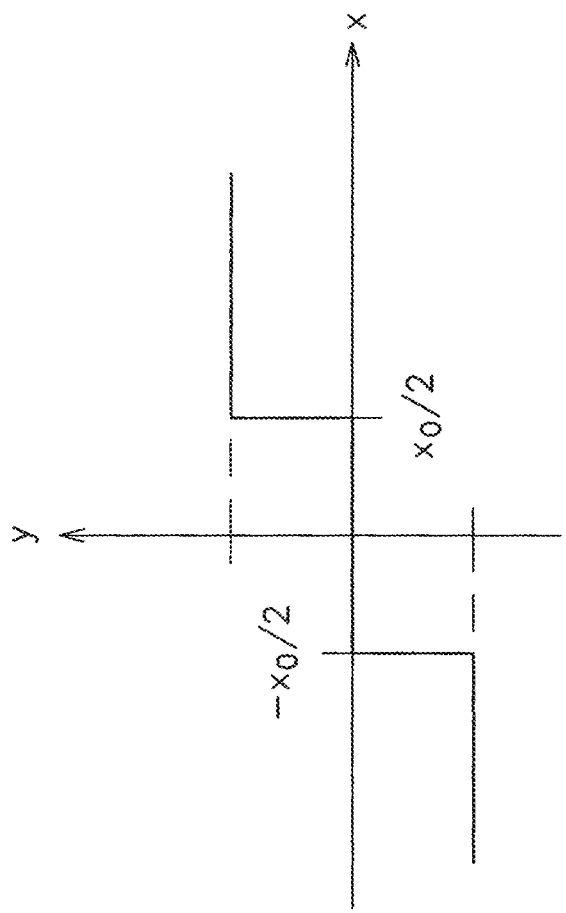
Figure 14:
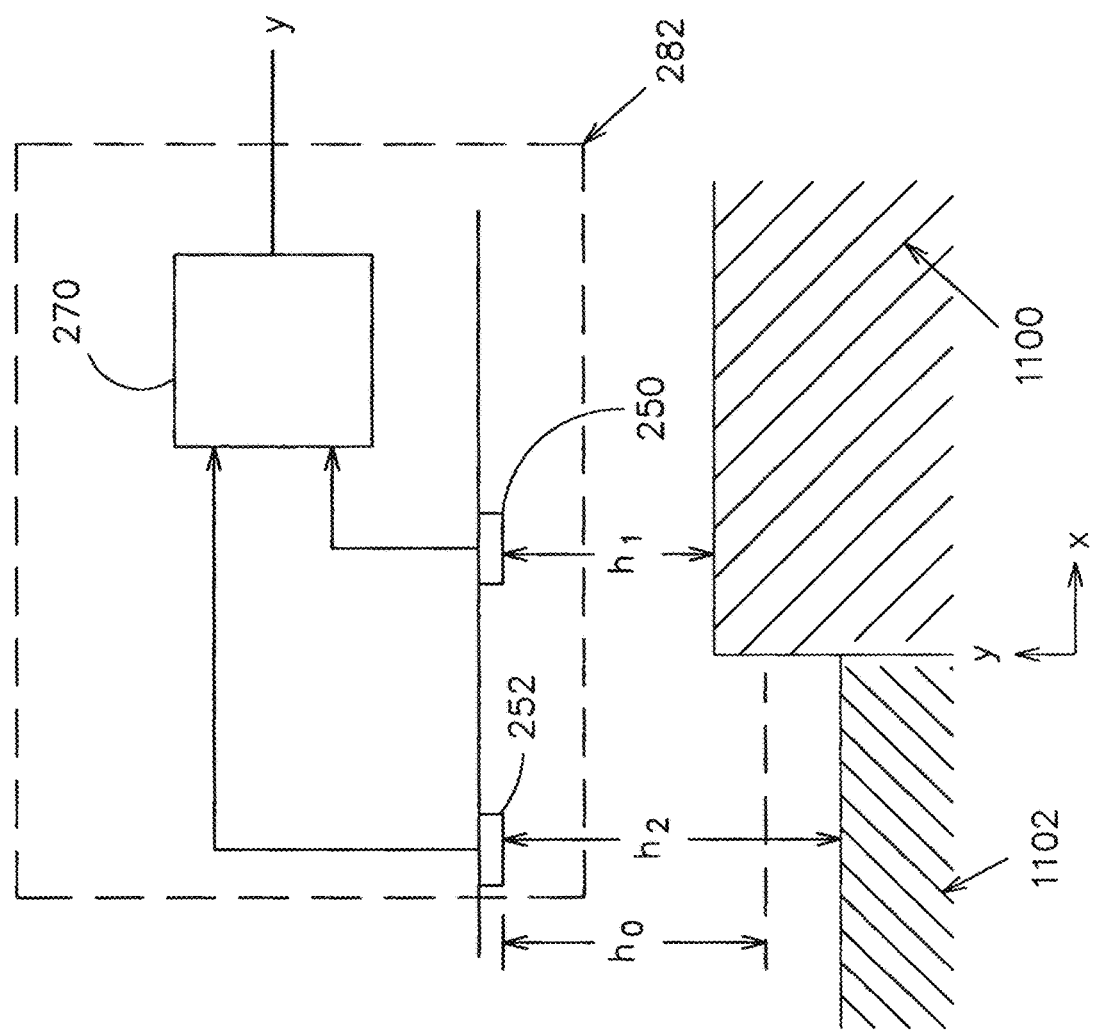
Figure 15:
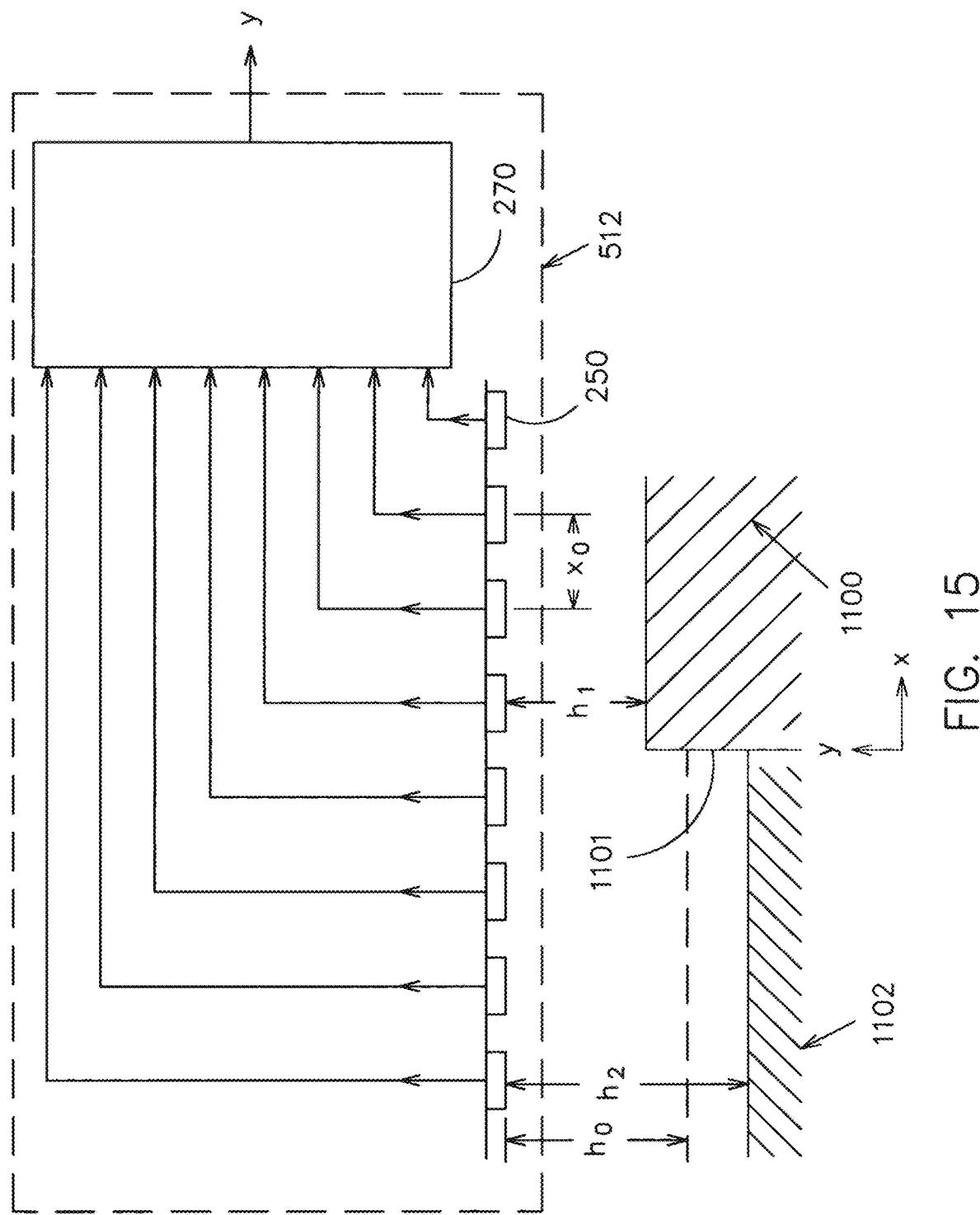
Figure 16:
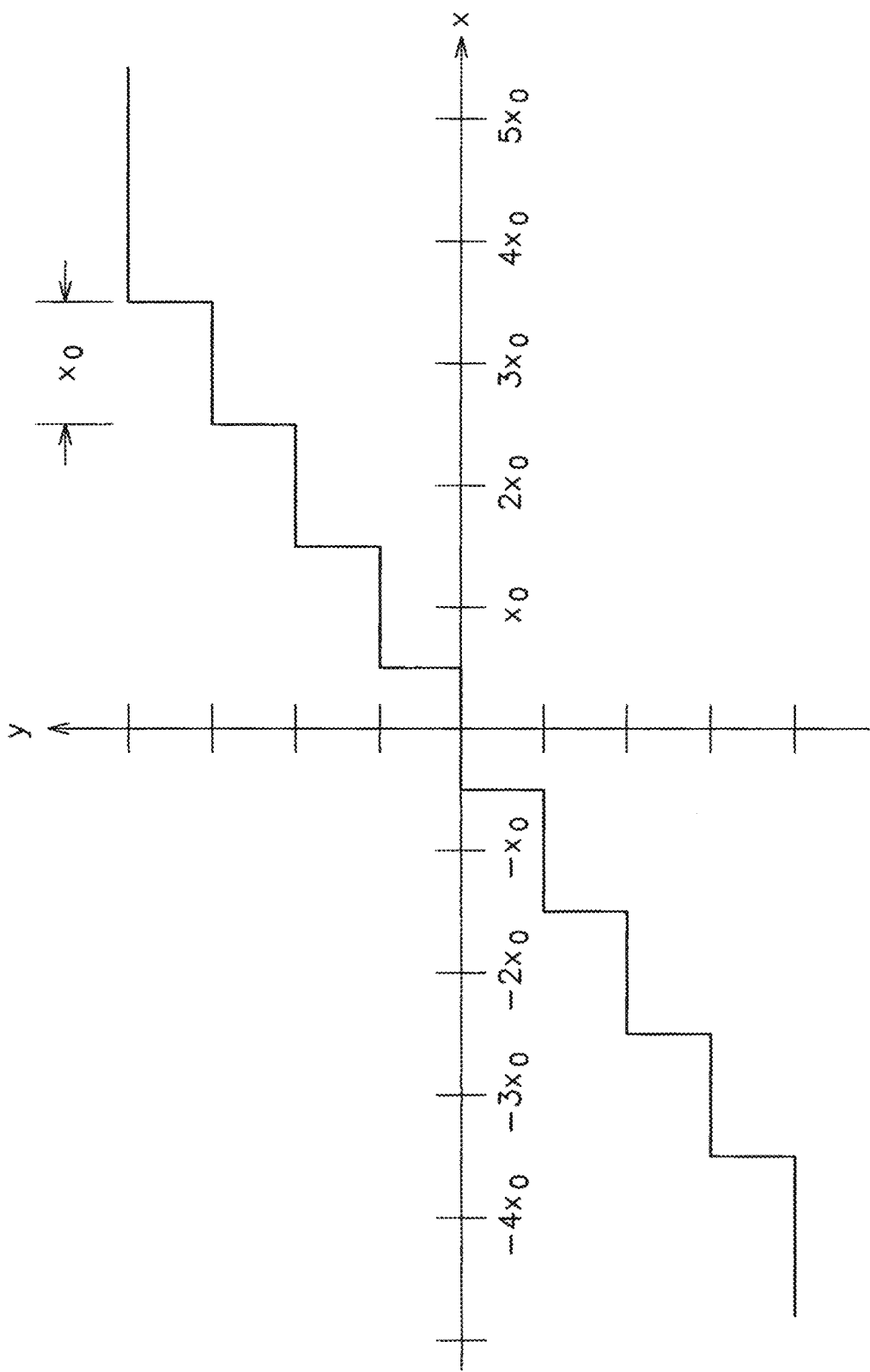
Figure 17A:
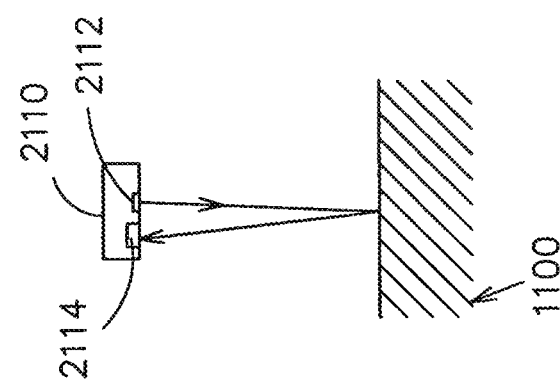
Figure 17B:
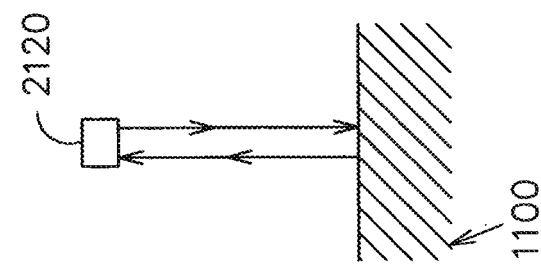
Figure 17C:
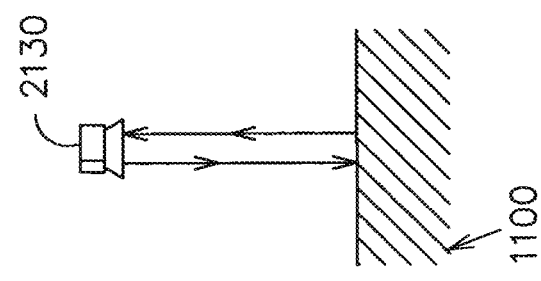
Figure 17D:
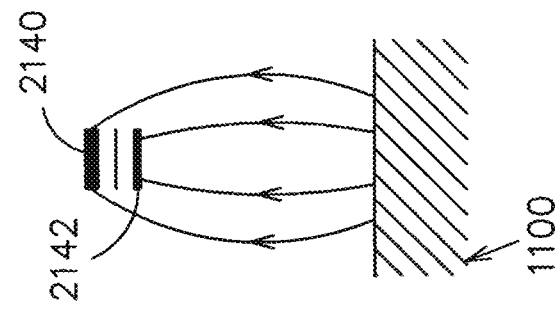
Figure 20A:
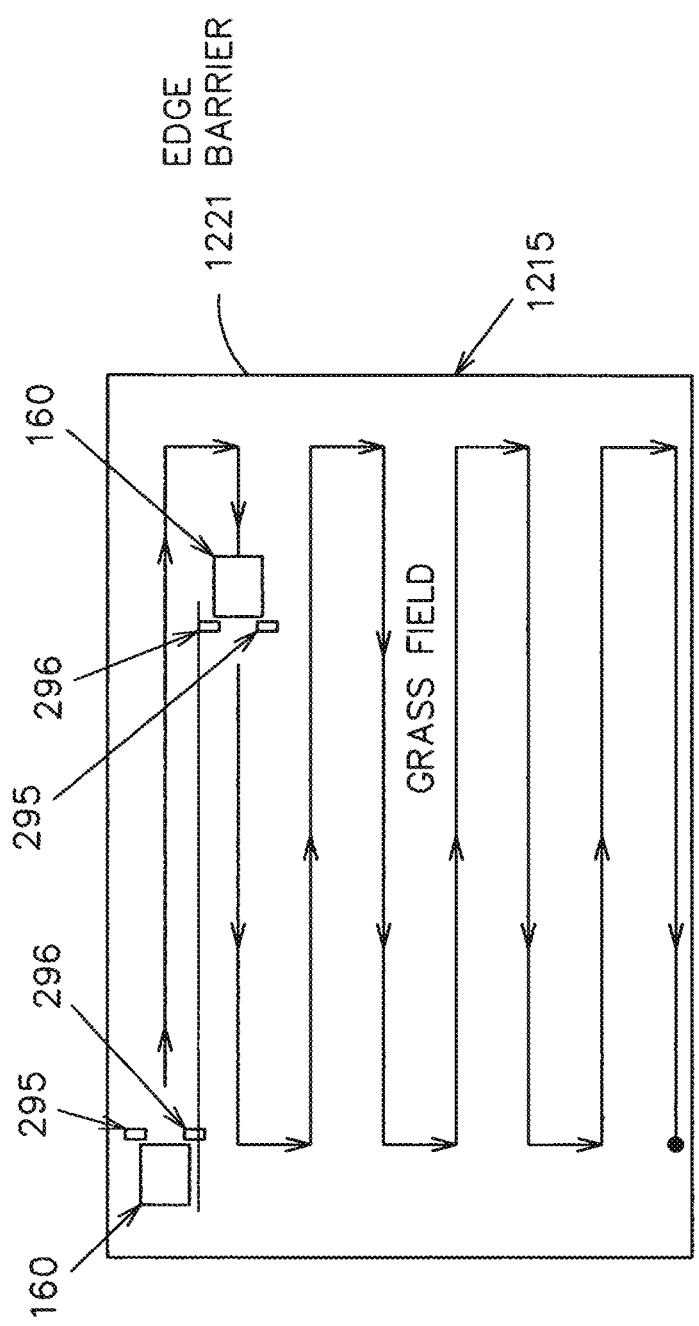
Figure 21A:
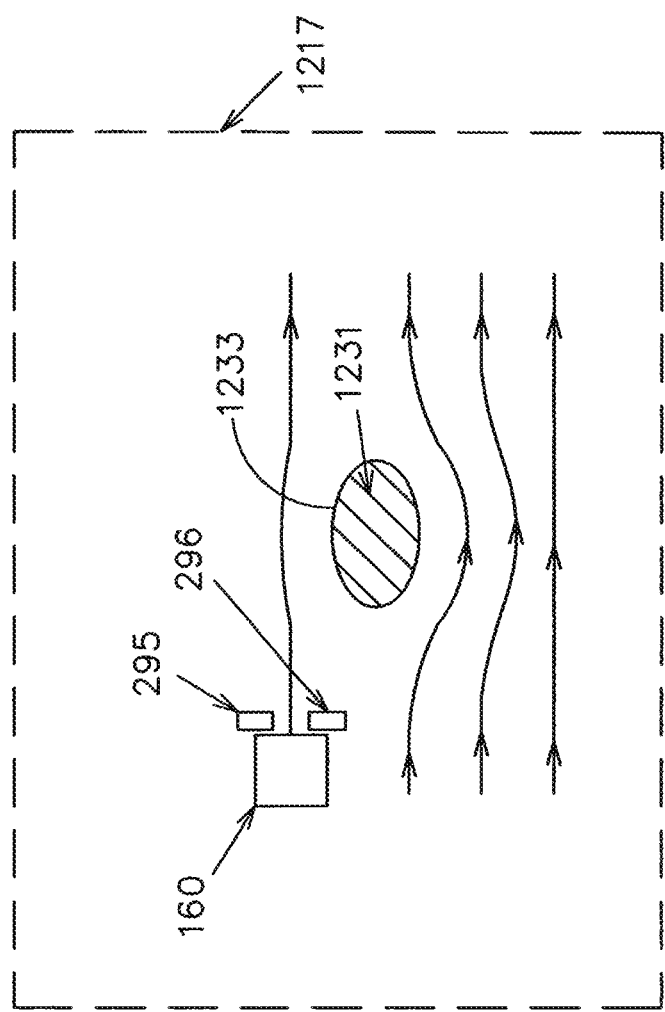
Figure 21B:
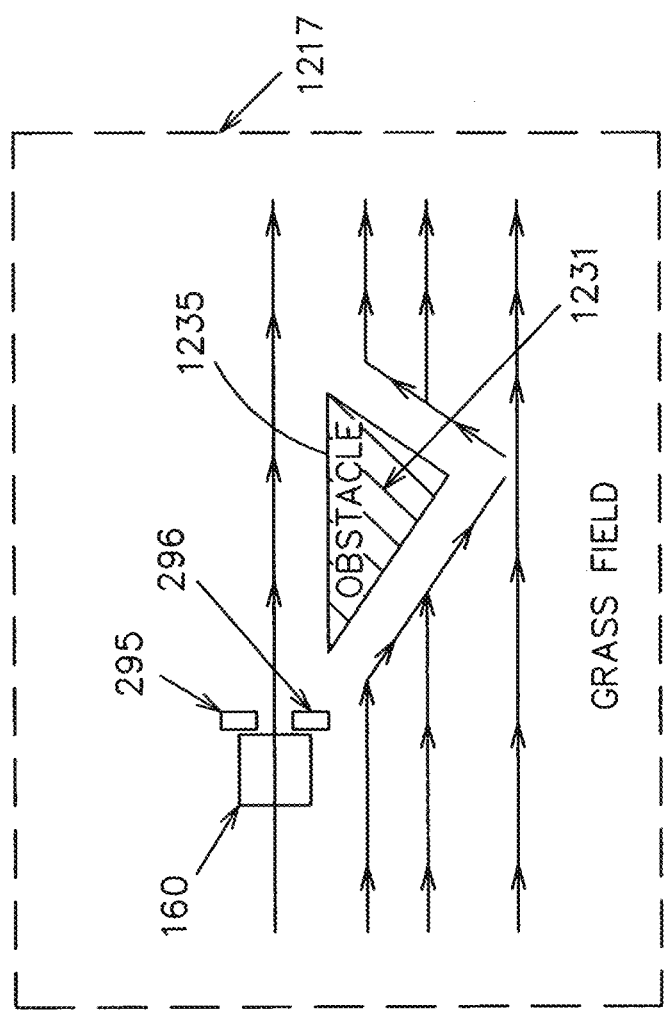
Figure 23:
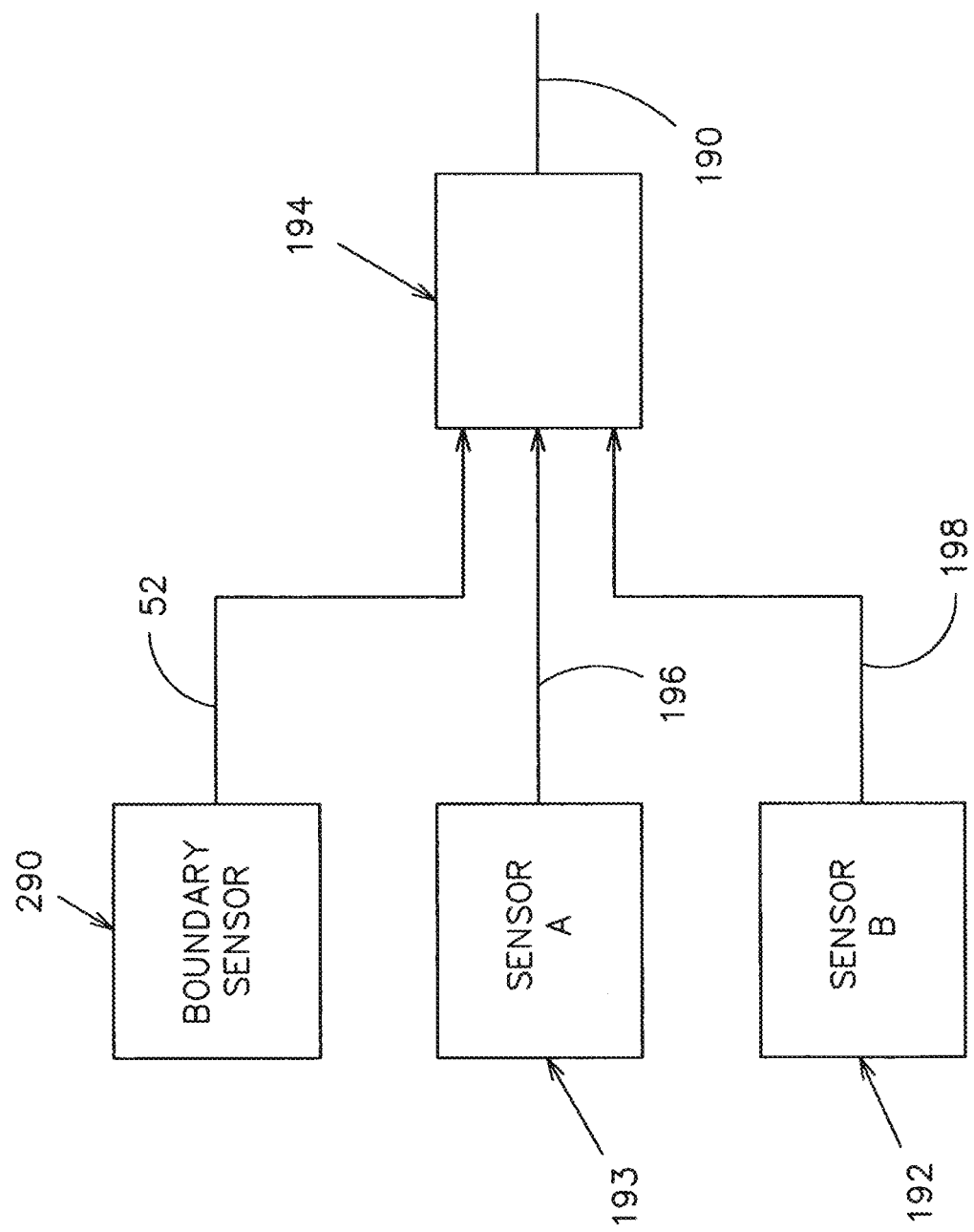
Figure 24A:
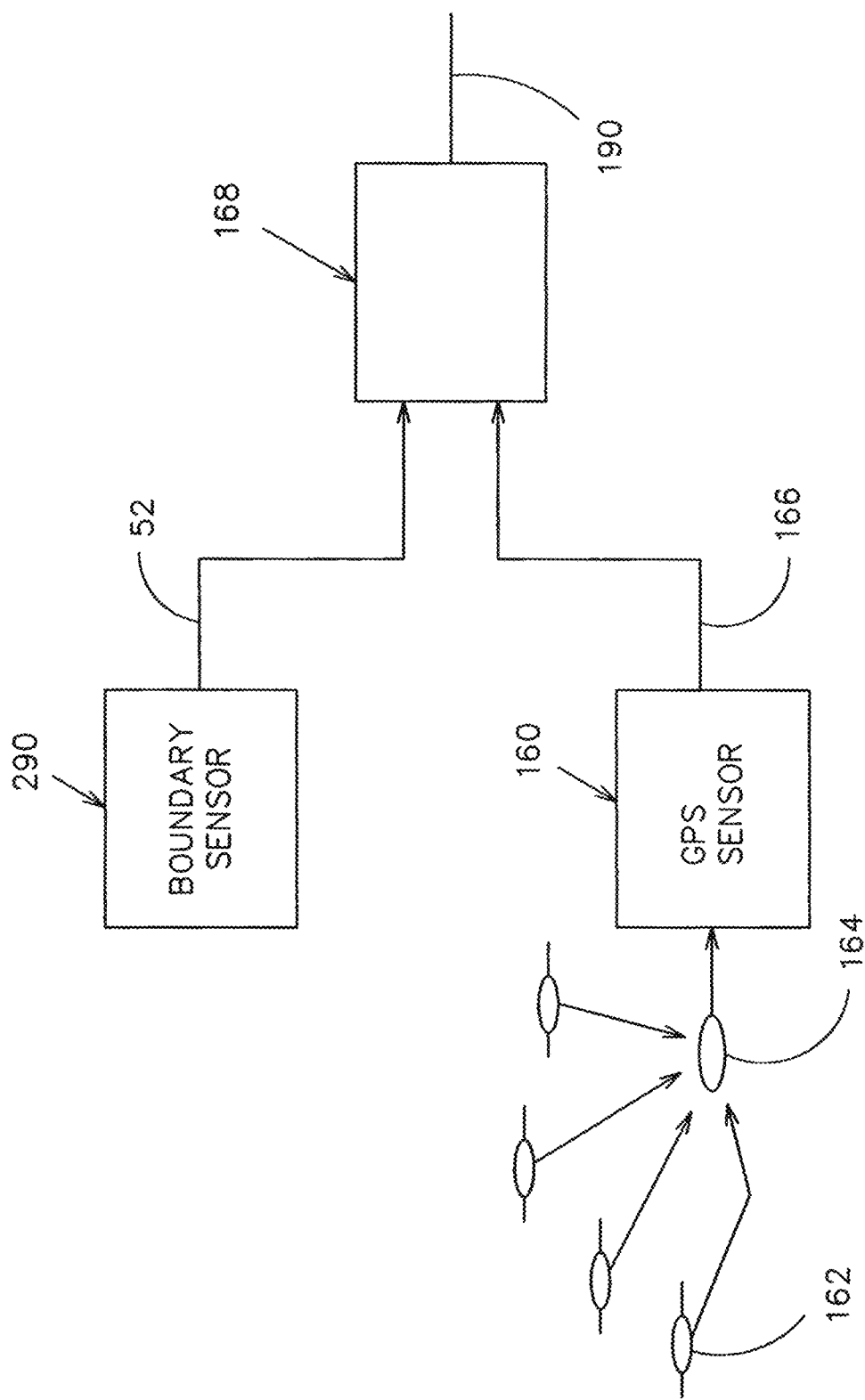
Figure 24B:
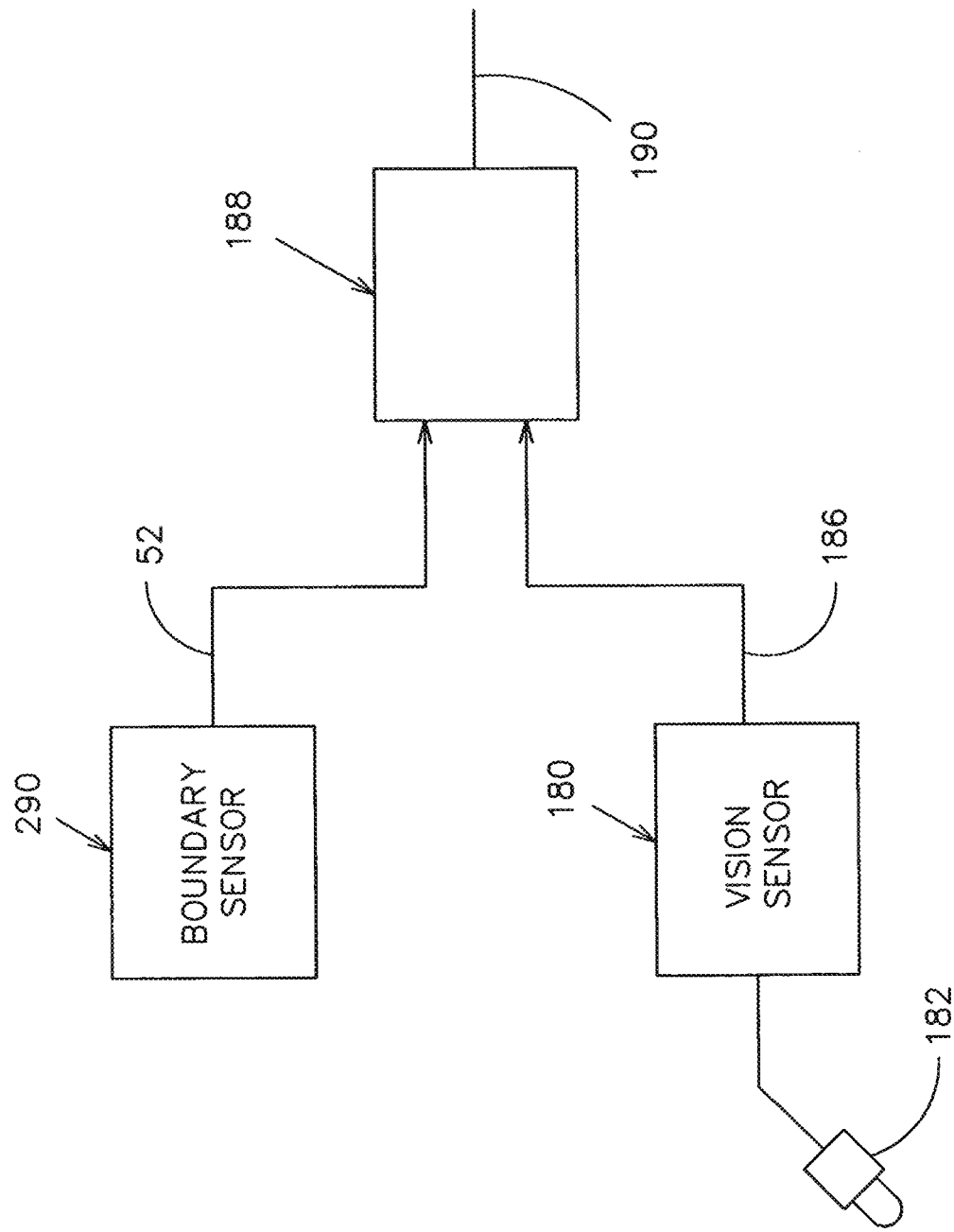
Figure 25A:
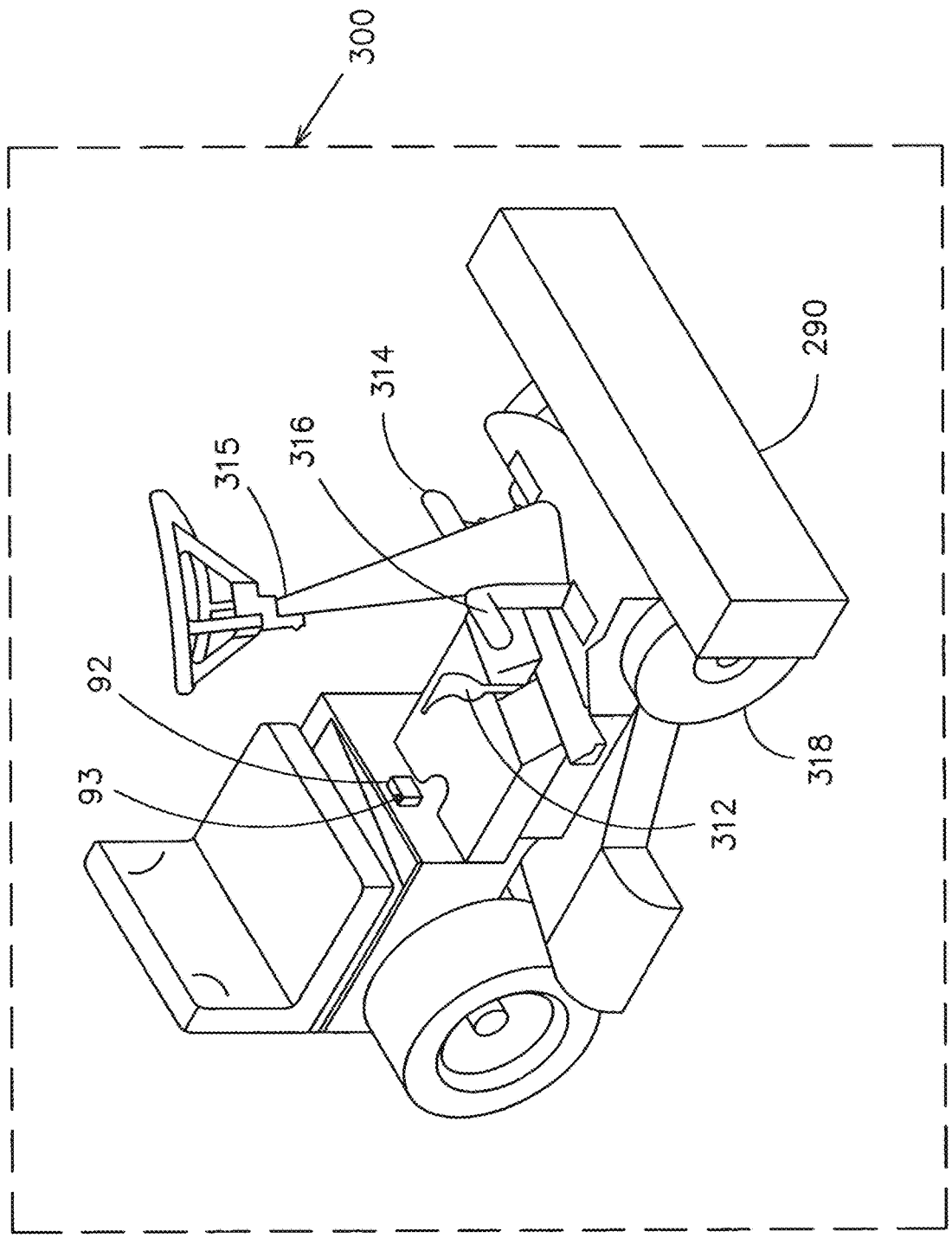
Figure 25B:
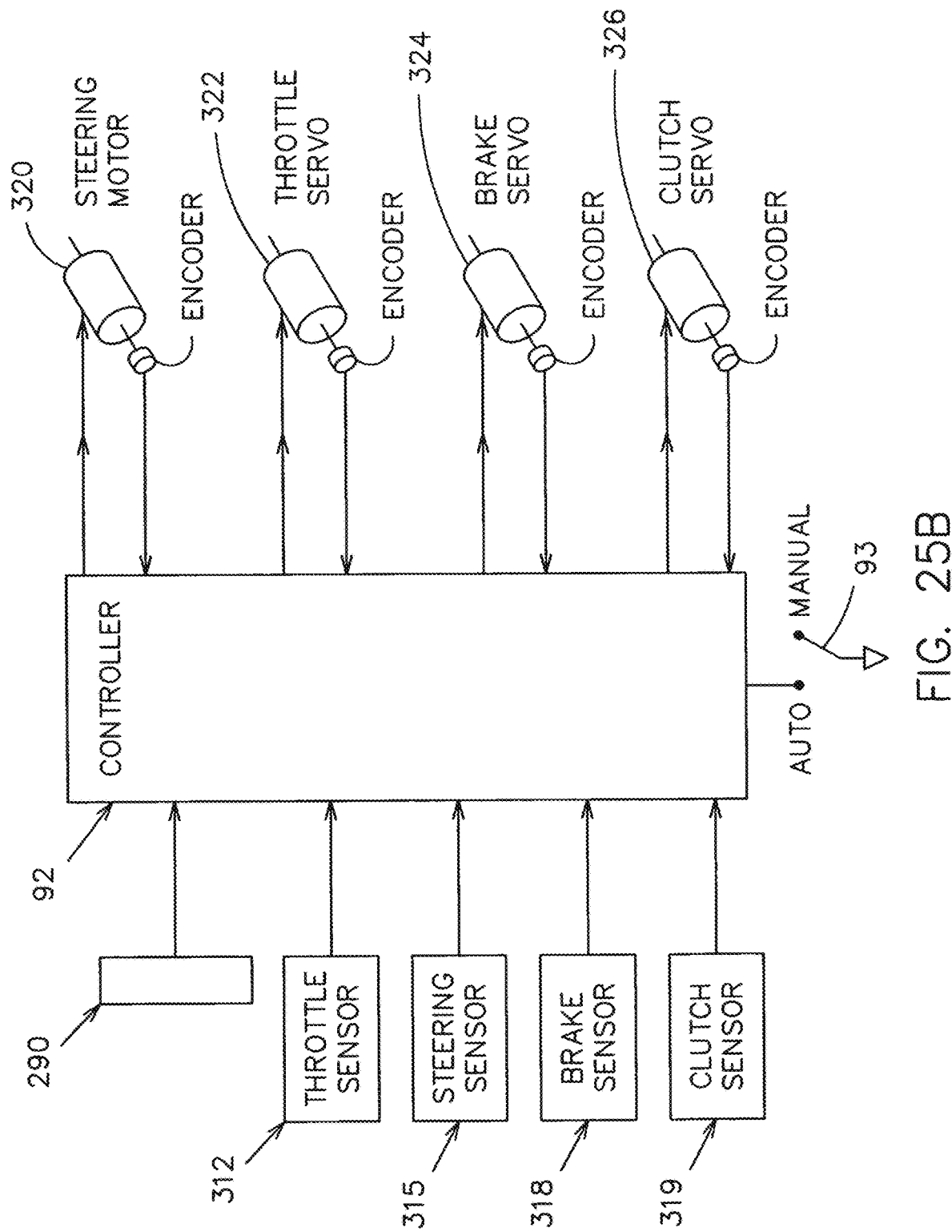
Figure 26A:
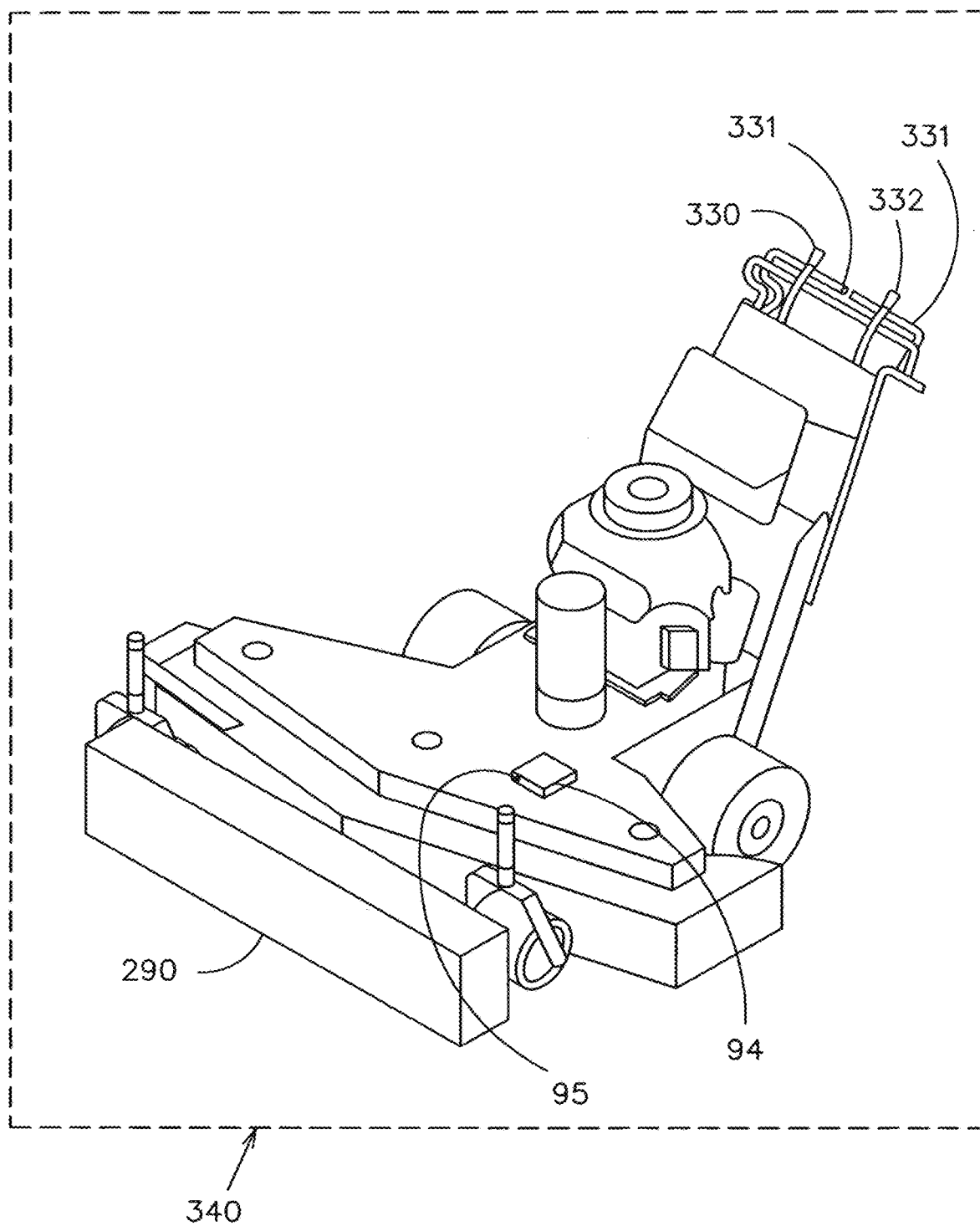
Figure 26B:
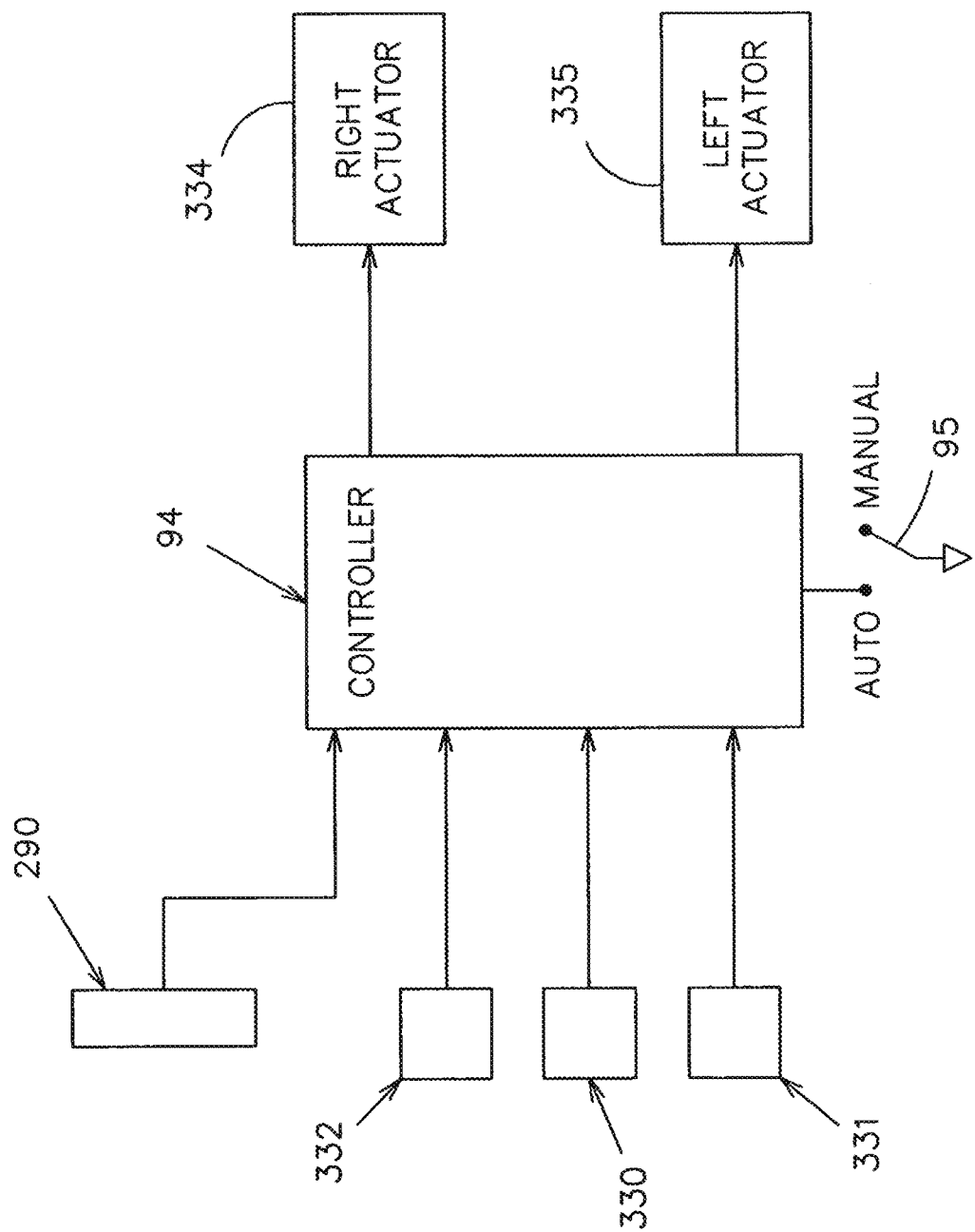
Figure 27B:
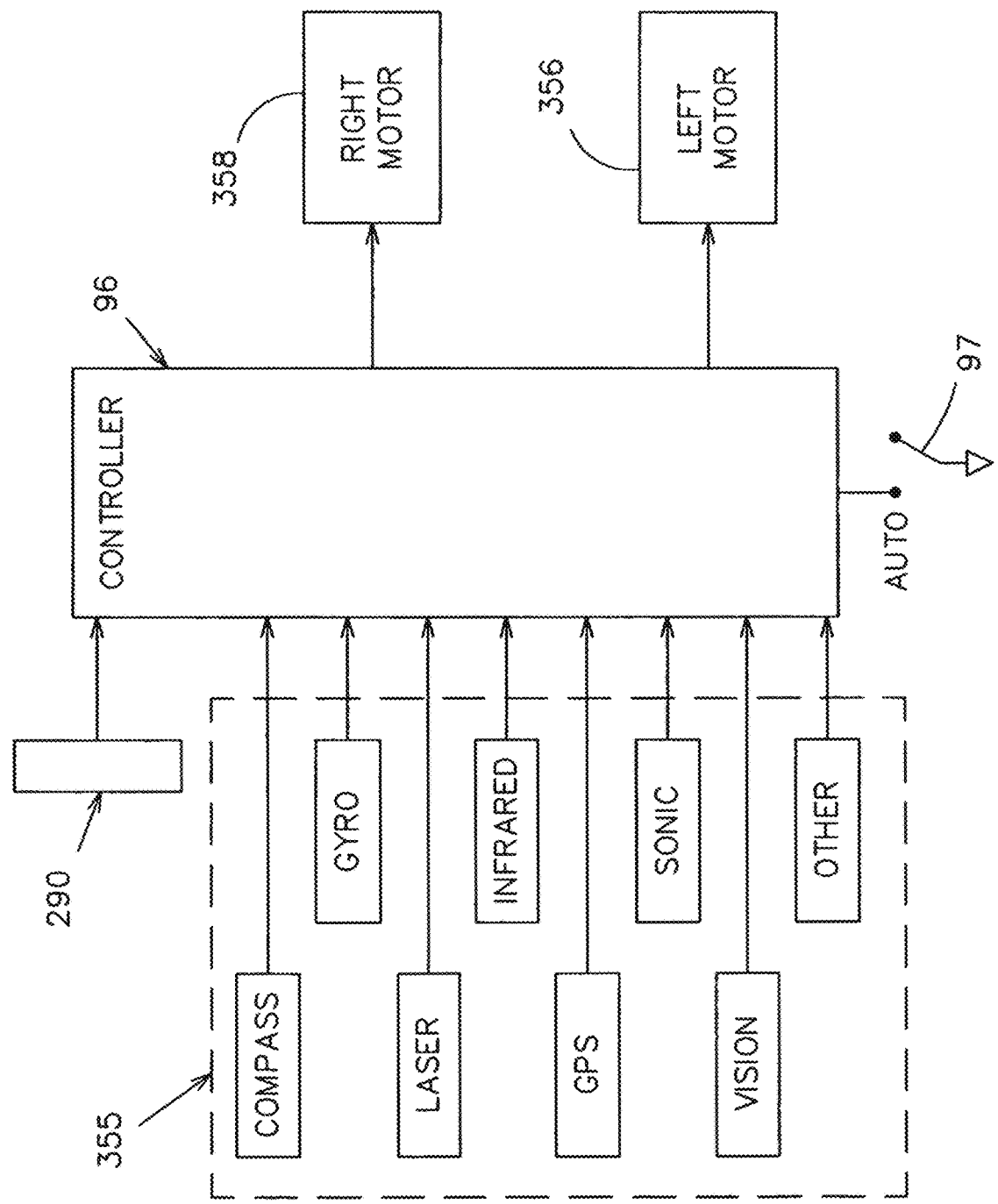
Figure 28:
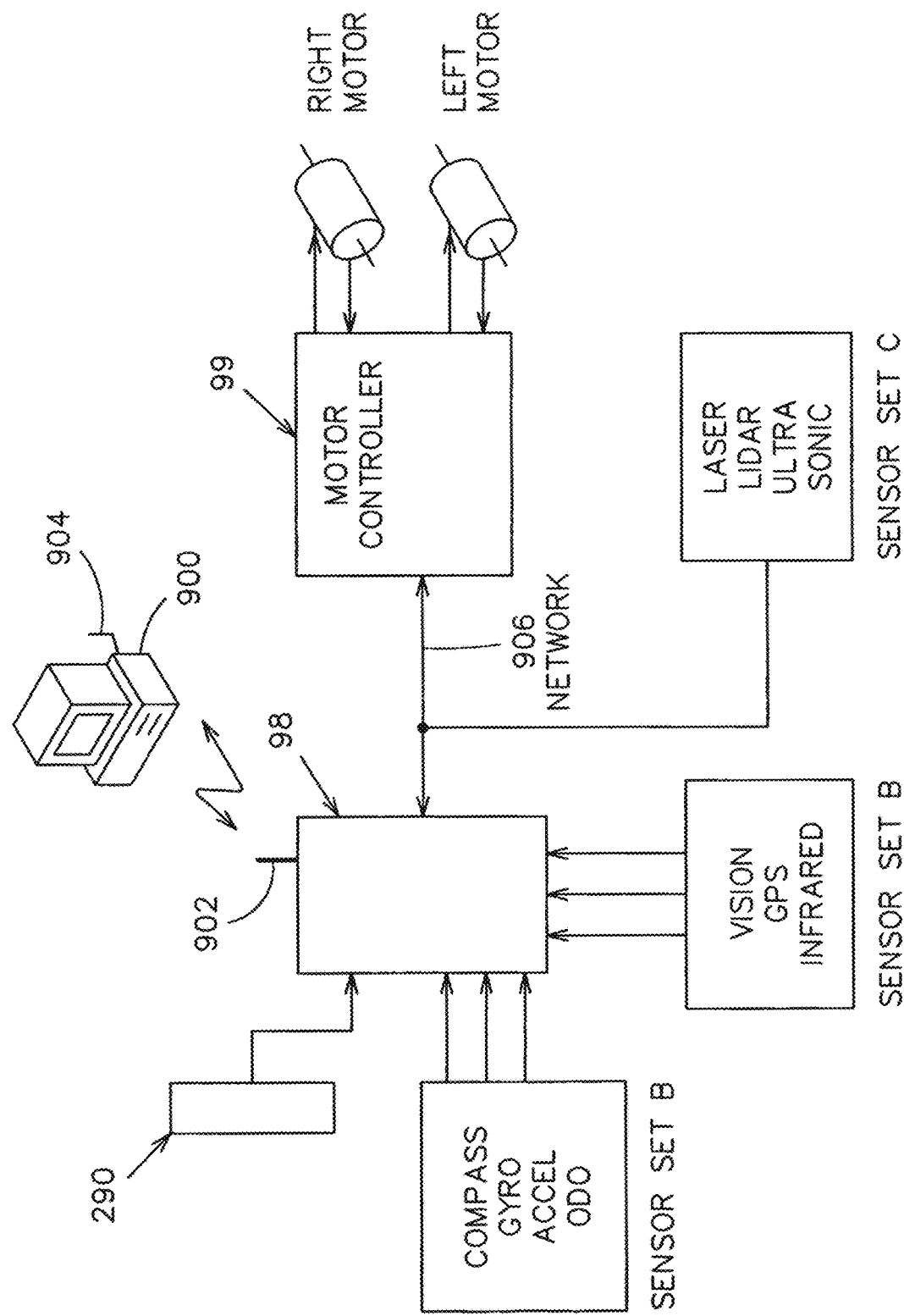

FIG. 1 is an isometric view of the preferred embodiment;
FIG. 2 is a block diagram of the control system of the preferred embodiment;
FIG. 3A is a front pictorial view of the boundary sensor using paddles for detecting the boundary between the mowed and un-mowed vegetation;
FIG. 3B is a front pictorial view of the boundary sensor using non-contact distance measuring devices for detecting the boundary between the mowed and un-mowed vegetation;
FIG. 4A is a front view of the paddle sensor with an obstruction and the hall-effect sensor mounted on the hub;
FIG. 4B is a side view of the paddle sensor showing the location of the magnets and hall effect sensor;
FIG. 5A is a side view of a rigid paddle;
FIG. 5B is a side view of a flexible paddle;
FIG. 6A is a front view of a wide paddle;
FIG. 6B is a side view of wide paddle;
FIG. 7A is a front view of a narrow paddle or rigid wire;
FIG. 7B is a side view of a narrow paddle or rigid wire;
FIG. 8A is a front breakout view illustrating a magnetic slip clutch mechanism;
FIG. 8B is a front breakout view illustrating a friction slip clutch mechanism;
FIG. 8C is a front breakout view illustrating a viscous slip clutch mechanism;
FIG. 8D is a front breakout view illustrating an electromagnetic slip clutch mechanism;
FIG. 9A is a pictorial view illustrating the magnetic pickup sensors arrangement;
FIG. 9B is a pictorial view illustrating the optical pickup sensors arrangement;
FIG. 9C is a pictorial view illustrating the magnetic pickup sensor arrangement mounted on the shaft;
FIG. 10A is a block diagram of the controller scheme using hall-effect pickup sensors and analog circuitry;
FIG. 10B is a block diagram of the controller scheme using hall-effect pickup sensors and a microcontroller;
FIG. 11 is a graphical plot of the output of the boundary sensor in FIG. 3A respect to the number of paddles that are in the mowed and un-mowed vegetation;
FIG. 12 is a front pictorial view of the boundary sensor with two distance measuring sensors;
FIG. 13 is a graphical plot of the output of the embodiment in FIG. 12;
FIG. 14 is a front pictorial view of the boundary sensor with two distance measuring sensors and a microcontroller;
FIG. 15 is a front pictorial view of the boundary sensor with eight distance measuring sensors;
FIG. 16 is a graphical plot of the output of the embodiment in FIG. 15;
FIG. 17A is a front pictorial view of the infrared distance measuring sensor;
FIG. 17B is a front pictorial view of the ultrasonic distance measuring sensor;
FIG. 17C is a front pictorial view of the radar distance measuring sensor;
FIG. 17D is a front pictorial view of the capacitance distance measuring sensor;
FIG. 18 is a top view of the vehicle and boundary sensor following a boundary;
FIG. 19A is a top view of a vehicle with the boundary sensor mounted on the front of the vehicle;
FIG. 19B is a top view of a vehicle with the boundary sensor mounted on the front left of the vehicle;
FIG. 19C is a top view of a vehicle with two boundary sensors mounted on the left and right sides in front of the vehicle;
FIG. 19D is a top view of a vehicle with the boundary sensor mounted on the front right of the vehicle;
FIG. 19E is a top view of a vehicle with two boundary sensors: one mounted on the front left of the vehicle and other mounted on the rear left;
FIG. 19F is a top view of a vehicle with two boundary sensors: one mounted on the front right of the vehicle and other mounted on the rear right;
FIG. 19G is a top view of a vehicle with four boundary sensors mounted on the corners of the vehicle;
FIG. 19H is a top view of a vehicle with two boundary sensors mounted on the front and rear of the vehicle;
FIG. 19I is a top view of a vehicle with two boundary sensors mounted on the front left of the vehicle;
FIG. 19J is a top view of a vehicle with the boundary sensor mounted on the front center of the vehicle;
FIG. 19K is a top view of a vehicle with two boundary sensors mounted on the front and rear center of the vehicle;
FIG. 19L is a top view of a vehicle with two boundary sensors mounted on the front right of the vehicle;
FIG. 19M is a side view of a vehicle with two boundary sensors mounted at different heights in front of the vehicle;
FIG. 20A is a top pictorial view of a mowing vehicle with boundary sensors following a path in the field back and forth;
FIG. 20B is a top pictorial view of a mowing vehicle with boundary sensor following a spiraling path in the field;
FIG. 21A is a top pictorial view of a mowing vehicle with boundary sensors following a path around an obstacle in an oval pattern;
FIG. 21B is a top pictorial view of a mowing vehicle with boundary sensors following a path around an obstacle in a triangular pattern;
FIG. 22 is a top pictorial view of an embodiment detecting a boundary between mowed and un-mowed vegetation where there is a gap in the vegetation;
FIG. 23 is a block diagram of the boundary sensor integrated with other sensors;
FIG. 24A is a block diagram of the boundary sensor integrated with a GPS sensor;
FIG. 24B is a block diagram of the boundary sensor integrated with a vision sensor;
FIG. 25A is an isometric view of another embodiment of the present invention;
FIG. 25B is a block diagram of the control system of the embodiment in FIG. 25A;
FIG. 26A is an isometric view of another embodiment of the present invention;
FIG. 26B is a block diagram of the control system of the embodiment in FIG. 26A;
FIG. 27A is an isometric view of another embodiment of the present invention;
FIG. 27B is a block diagram of the control system of the embodiment in FIG. 27A;
FIG. 28 is a block diagram of the control system interfaced to an offboard computer;

DESCRIPTION OF INVENTION

The preferred embodiment as shown in FIG. 1 is a semi-automated or automated mowing vehicle 150 with sensors 72 and 73, control levers 76 and 78, a controller 90, boundary sensor assembly 290, a mowing deck 79, wheels 74 and 75, vehicle power 151, and a operator's seat 71. A useful embodiment is to extend the sensor assembly 290 laterally beyond the cutting swath affected by mowing deck 79 in order to minimize overlap between cutting swaths.

In the semi-automated mode, the riding lawn mower 150 can be controlled by a seated operator using the left control lever 76 and the right control lever 78. The left control lever 76 is connected to the left sensor 73 which in this embodiment contains a potentiometer. The right control lever 78 is connected to the right sensor 72, also contains a potentiometer. Sensors 72 and 73 can contain potentiometers, optical encoders, linear potentiometers, magnetic encoders, or other sensors indicating the movement of the levers. The operator controls levers 78 and 76 which in turn changes the sensors 72 and 73 settings. The sensors are connected to a controller 90 as shown in FIG. 2. The output of the controller 90 controls one or more actuators 298 and 299. Actuator 299 controls the right wheel via an electrohydraulic control valve for a hydrostatic drive mechanism or via direct drive electric motor to the right wheel 75. Likewise, the left actuator 298 controls the left wheel via electrohydraulic control valve or direct electric motor to the left wheel.

In the semi-automated mode, the operator can control the speed and steering of the vehicle 150 by the levers or can set the commanded speed via other controls and allow the boundary sensor 290 to control the vehicle steering along the cut and uncut vegetation, or may set the system to follow the boundary sensor 290 until a combination of rate and excursion of the levers 78 and 76 revert the controller 90 to following only the inputs of the levers 76 and 78. The front boundary sensor assembly 290 controls the vehicle steering 150 by following the boundary between the cut vegetation and the uncut vegetation as shown in FIG. 3A and FIG. 3B. Shown in FIG. 2, the input to the controller 90 is from the sensor assembly 290 and the vehicle 150 is steered differentially in this configuration using the controller 90 to drive the left and right actuators 298 and 299 respectively. FIG. 3A illustrates a plurality of rotating paddle sensors 34 some of which contact the uncut vegetation 38 and some of the paddle sensors 34 do not contact the cut vegetation 32. Detection of contact of the paddle sensors 34 with vegetation 38 is by sensing a difference in the rotation of the sensor 34 and its supporting shaft. By detecting the number of paddle sensors 34 contacting the uncut vegetation 38, the relatively higher surface, versus the number of paddle sensors 34 not contacting the cut vegetation 32, the relatively lower surface, the boundary between the two surfaces, the cut and uncut vegetation, can be determined and output 52 from the paddle sensor 500 to controller 90. Here, the front boundary sensor assembly 290 using the rotating paddles is shown as paddle sensor 500. In FIG. 3B shows a non-contact sensor assembly 510 using plurality of distance sensors 250 to detect the boundary 1111 between the first, a relatively higher surface, the uncut vegetation 1104, and the second, a relatively lower surface, the cut vegetation 1105.

In the autonomous mode via switch 91, the operator is not present, inputs from levers 76 and 78 are ignored, and the controller 90 controls the vehicle 150 around the vegetation based on the programmed vehicle speed and from the front boundary sensor assembly 290 which detects the boundary between two surface levels in this case the cut and uncut vegetation. For the first pass, the vehicle 150 can transverse the border between the vegetation, the relatively higher surface, versus the flower bed or sidewalk, the relatively lower surface, or the operator can cut a path where he/she would like the vehicle 150 to travel.

Contacting Boundary Sensor

FIG. 4A shows a block diagram of a sensor in the paddle sensor assembly 500. A paddle 34 is installed on a rotating shaft 46 and coupled to the shaft's motion by a hub 36 which is physically connected to the rotating shaft 46. The coupling mechanism between the hub 36 and the paddle 34 is a magnetic force between the permanent magnets 64 and the magnetic material 62 placed on the paddle 34. As the shaft 46 rotates, the paddle 34 rotates with the shaft 46 because of the magnetic coupling force. A hall-effect sensor 40 is mounted on the hub 36 that rotates with the shaft 46. In this configuration, the sensor 40 rotates with the shaft 46 and detects the relative motion between the paddle 34 and the shaft 46. The sensor output 170 which comes from the sensor 40, via wires 171 through the slip ring 163, gives relative motion and is zero when the shaft 46 and the paddle 34 are rotating close to the same rate. When a substance 100 is placed in the path of the rotating paddle 34, the magnetic force coupling the hub 36 to the paddle 34 is not sufficient to overcome the drag on the paddle 34 caused by the substance 100. The paddle 34 does not rotate at a rate close to that of the shaft 46. Since the hub 36 is still rotating, the sensor 40 detects the rotation of the hub 36 with respect to the paddle 34 and outputs on line 170 a signal every time the sensor 40 passes by the magnetic material 62. The embodiment therefore can detect substances impeding the movement of the paddle 34 by output a signal on line 170. If no substance is impeding the paddle 34, there would be no signal on line 170. Similarly if the shaft is held fixed, the substance, when passing the paddle 34, will cause the paddle to have a higher rotation rate than that of the shaft causing a signal on line 170. Use of a motor 30, or fixed shaft would depend on the application—the type of substance (a stiff crop, or soft grass).

FIG. 4B shows the side view of a sensor in the sensor assembly. In this view, the sensor 40 is shows on one side of the hub 36 and the permanent magnets 64 are shown on the opposite sides of each other. The time resolution of the signal 52 can be varied by changing the shaft speed or the number of magnetic materials 62.

FIG. 5A and FIG. 5B show variations of the design of the paddles. FIG. 5A shows a rigid paddle 80 whereas FIG. 5B shows a flexible paddle 82. Applications for a rigid paddle 80 would be in movable material such as grain, oil, unmowed vegetation etc. Applications for a flexible paddle 82 would be to detect rigid substances such as a sidewalk curb, unmowed vegetation, ground, etc. In addition, the paddle may be formed of sturdy or flexible wires, rods, spokes, etc.

FIG. 6A and FIG. 6B show two views of wide paddle 83. FIG. 7A and FIG. 7B show two views of a very narrow paddle 130. Different paddle widths allow different surfaces to be detected; also, the width and spacing of the paddle are two factors determining the resolution of the output.

All types of paddles can be used in the paddle sensor. Different widths of the paddle can also be used in the same paddle sensor for a nonlinear output of the sensor. There may be only one paddle or multiple paddles on the same paddle wheel. Different lengths of the paddle can be used on the multiple paddle wheels.

FIGS. 8A, 8B, 8C, and 8D illustrate several different methods of coupling the shaft 46 to the paddle 34. The coupling mechanism is a slip clutch device that holds the rotating items together until the torque or rotational force between the two items exceeds a set value. The set value can be pre-determined, variable, or programmable. The coupling depends on the application and its needs to be firm enough to allow the paddle 34 to rotate with the hub 36 which is attached to the shaft 46 when no obstruction to the paddle 34 exists. However, if the paddle 34 is perturbed from rotating with the hub 36, the mechanical coupling would allow the paddle 34 to rotate with respect to the shaft 46 and hub 36. FIG. 8A shows the magnetically coupled hub 36 with the paddle 34. FIG. 8B shows a friction coupled hub 139 to the paddle 110. FIG. 8C shows a vicious coupled hub 124 to the paddle 120 by a fluid 122. FIG. 8D shows an electromagnetic coupling mechanism where the attractive forces between an electromagnetic coil 39 and the magnetic material 62 can be varied by an electric current driven into the electromagnetic coil 39. The coupling forces can be easily be altered via the electric current for different applications. Also, the electromagnetic coil 39 can have a dual use and be used as a sensor to detect relative rotation between the shaft 46 and the paddle 34 in addition being part of the slip clutch mechanism. Other slip clutch mechanisms such pneumatic, hydraulic, etc. can be employed to allow the paddle 34 to rotate with the shaft 46 when there is no obstruction to the paddle 34, but if an obstruction exists, the paddle 34 would not rotate with the shaft 46. Similarly such pneumatic and hydraulic coupling means may also be fitted with appropriate pressure sensors to detect relative rotation of the paddle 34 to the shaft 46 and hub.

FIGS. 9A, 9B, and 9C show different sensors for detecting the rotating motion of the paddles. In FIG. 9A, magnetic sensors 40 detect the rotation of paddles 34. In FIG. 9B, optical sensors 140 detect the paddles' rotation. In FIG. 9C, magnetic sensors 141 detect the paddles' rotation, but the magnetic sensors 141 are installed into a hollow shaft 47 and uses slip rings 143 to provide an output. Other schemes to detect a rotating shaft can be used in addition to the ones mentioned, such as capacitive sensor or inductive sensor, for example.

In the module design 50, FIG. 10A shows implementation using standard logic circuitry. Comparators 202 compare the information from the sensor 200 with the information from the reference sensor 201 or pre-determined speed. If the outputs of the two sensors rotate at similar speeds, the output 203 from the comparator 202 would be low. If they are at different, the output after proper filtering would be high. Summing these output values in an adder circuit 206 with weighted values would give an output 52 that shows the number of paddles 40 having rotational obstruction.

FIG. 10B shows use of a microcomputer 51 instead of the logic circuitry of FIG. 10A. The microcomputer 51 would be programmed to accomplish the logic circuitry design. The reference sensor 220 is not needed if the magnetic sensors 210 detect relative motion instead of actual rotating motion or if a pre-determined shaft speed is used.

From FIG. 3A, which shows a block diagram of sensor assembly 500, a more detailed explanation is described. A motor 30 drives a shaft 46 which is physically connected to the hubs 36. The hubs 36 are magnetically, mechanically, fluidly, or similarly coupled to the paddles 34. The sensors 40 detect the motion of the rotating paddles 34. A reference sensor 41 detects the motion of the shaft 46. The module 50, via lines 44, compares the motion detected by the sensors 40 to the motion detected by the reference sensor 41 and determines which paddle is moving at a similar velocity as the shaft 46. The output 52 of the module 50 is the detected boundary 37 and the number of paddles 34 that are moving and not moving relative to the shaft 46. The vegetation 38 that is not mowed will perturb the paddles 34 from rotating with the shaft 46. The paddles 34 that are in area of the mowed vegetation 32 will rotate with the shaft 46.

FIG. 11 show the output 52 where the overall paddle sensor 500 detects the boundary between the mowed vegetation 32 and the unmowed vegetation 38 in FIG. 3A. The output signal 52 depends on the number of paddles 34 that are in the unmowed vegetation 38, compared to the number of paddles 34 that are not. As an example, if a total of six paddles are used and four are in the mowed vegetation 32, then the output is would indicate one step to the left, i.e. level' A' in FIG. 11. If equal number of paddles 34 are detected in the mowed 32 and unmowed vegetation 38, then the output signal would be even or zero in this case. The output signal 52 indicates the position of the paddles 34 relative to the boundary 37. The signal 52 depends on the total number of paddles 44, the width of the paddles 34, and the number of paddles in the substance, in this illustration, vegetation.

Non-Contacting Boundary Sensor

FIG. 12 shows a block diagram of a sensor in sensor assembly 510 in FIG. 3B. Sensors 250 and 252 are distance measuring sensors such as infrared distance sensors, ultrasonic distance sensors, microwave distance sensors, laser distance sensors, vision distance sensors, and other non-contact distance measuring sensors. Sensors 250 and 252 measures distance to the surfaces 1100 and 1102, respectively, Sensor 252 measures the distance h2 from the relatively lower plane defined by the tips of vegetation or other detected surface 1102 and sensor 250 measures the distance h1 form the relatively high plane or surface 1100. The distance measurements from the sensors 250 and 252 are compared to the distance h0 which is between the distances h2 and h1. Comparators 254 and 256 compare the distance measurements from the sensors to the distance h0. If sensor 252 measures h2, the output of the comparator 254 is a low signal level. If the sensor 250 measures h1, the output of comparator 256 is a low signal level. Subtracting output from comparator 256 from the output from the comparator 254 gives the output y, 260. Since both output signals are low, the output is zero. FIG. 13 shows the output y versus the distance x from the boundary 1101. The spacing x0 is the distance between the two sensors. If both sensors 250 and 252 are over the relatively higher surface 1100 and each measures h1, then the outputs of the comparator 254 would be a high signal level and the output of comparator 254 is a low signal level. Subtracting the high signal level with low level gives output 260 of a high positive level as shown in FIG. 13. Likewise, if both sensors 250 and 252 are measuring the relatively lower surface 1102, the sensors 250 and 252 would measure approximately distance h2. The output of the comparator 254 would be a low signal level, but now the output of the comparator 256 is a high signal level. Subtracting the high signal level from the low signal gives a high negative signal as shown in FIG. 13 when both sensors 250 and 252 are measuring the relatively lower surface 1102. The boundary 1101 is detected when sensor 252 is over the relatively lower surface 1102 and sensor 250 is over the relatively higher surface 1100. The spacing x0 between sensors 250 and 252 determine the spacing error in determining the boundary 1101 between the two relatively dissimilar surface levels.

FIG. 14 shows another non-contact sensor assembly 282 which uses a microcontroller 270 instead of the digital and analog circuitry. The microcontroller 270 processes the two distance measurements h2 and h1 from sensors 252 and 250, respectively, and outputs y similarly to FIG. 13. The comparison distance h0 can be derived prior to operating the embodiment 282 and input to the microcontroller 270 as a parameter. The comparison distance h0 can be derived during the initialization phase by taking the average between h1 and h2. The comparison distance h0 can be continuously derived from taking ongoing measurements of the relatively higher surface and the relatively lower surface with sensors 250 and 252 or from a separate module.

FIG. 15 shows an embodiment 512 with array of distance measuring sensors 250 spaced a distance x0 apart at the same horizontal level. Each sensor 250 measures either the relatively lower surface 1102 as a distance h2 or the relatively higher surface 1100 as a distance h1. When comparing the sensors 250 distance measurements with a comparison distance h0, an output y from the microcontroller 270 would be as illustrated in FIG. 16 where the detected boundary 1101 is centered in the middle of the sensor array. The output y could have the detected boundary 1101 set between any of the sensors 250 of the sensor array by an offset. As shown in FIG. 15, each time a sensor 250 crosses the boundary 1101, going from a relatively higher surface 1100 to a relatively lower surface 1102 or from relatively lower surface 1102 to a relatively higher surface, a step wise output occurs due to the change in comparing that sensor distance measurement with the comparison distance h0. If the sensors 250 are equally spaced, a linear step wise output y occurs from the embodiment 290 as illustrated in FIG. 16. The sensors can be spaced at various distances from each other. Sensors can be spaced very closely where the detected boundary 1101 is located and farther apart when further from the detected boundary 1101. This would be useful in providing guidance signals to autonomous vehicles, where the needed accuracy is near the detected boundary.

FIGS. 17A-17D shows four preferred distance measuring sensors use as sensor 250. These distance measuring sensors use different methods to derived distance. In FIG. 17A, an infrared sensor 2110 transmits an infrared signal from infrared LED 2112 and receives the reflected response in integrated circuit 2114. The angle between the transmitted and received signals determines the distance based on geometry. Sharp Corporation is one manufacturer that produces these types of sensors and denoted these products as GP2D12, GP2D15, GP2D120, etc. The measuring sensor 2120 in FIG. 17B uses ultrasonics to determine the distance to the surface 1100. The ultrasonic measuring sensor 2120 transmits a sound wave pulse and receives the echo from the surface 1100. By comparing the time between the transmitted pulse and the received pulse, the distance can be determined. The distance measuring sensor 2130 in FIG. 17C uses microwaves to determine the distance to the surface 1100. A wideband radar pulse is transmitted at the surface 1100 and the received echo is compared with the transmitted pulse to determine the distance. The measuring sensor 2140 in FIG. 17D is a capacitance distance measuring sensor. The extra capacitance plate 2142 extends the range of the capacitance sensor. The distance is derived from the capacitance measured from the surface 1100. The capacitance is greater when the measurement sensor 2140 is closer to the surface 1100 and less if the sensor 2140 is further away. There are other distance measuring sensors such as laser distance sensor and vision distance sensors that could also be used for distance measuring sensor 250 of the invention.

Referring back to FIG. 3B, the embodiment 510 is use in the application for detecting the boundary between the cut grass 1105, a relatively lower surface, and that of the uncut grass 1104, a relatively higher surface. As similarly described above, the sensors 250 measure the distances from the sensor array frame to either the relatively lower surface in this case, the cut grass 1105, or the relatively higher surface, the uncut grass 1104. By comparing the distance measurements from the two surfaces of different levels to a reference measurement, the number of sensors 250 in the cut grass 1105 and the uncut grass 1104 can be determined. The output y 292 indicates the boundary between the cut and uncut grass by the number of sensors in each region.

Vehicle/Sensor Configuration

FIG. 18 shows a top view of the boundary sensor 290 mounted on the front of a vehicle 150. In this application, the boundary sensor detects the boundary 1111 from comparing the number of internal sensors detecting the relatively higher surface 1104 to the number of internal sensors detecting the relatively lower surface 1105. The boundary sensor 290 is providing guidance signals to the vehicle 150 to steer the vehicle 150 along the boundary 1111.

The boundary sensor 290 can be mounted on a vehicle 150 in different configurations as illustrated in FIGS. 19A-19M. In FIG. 19A, the boundary sensor 290 is mounted on the front of the vehicle. In FIG. 19B, the boundary sensor 290 is mounted on the left side of the vehicle 150. In FIG. 19C, two boundary sensors 290 are mounted on the left and right front sides. In FIG. 19D, the boundary sensor 290 is mounted on the right side of the vehicle 150. In FIG. 19E, two boundary sensors 290 are mounted on the left and in FIG. 19F; two boundary sensors are mounted on the right. This configuration would be used to determine vehicle orientation in addition to detecting the boundary. FIG. 19G illustrates four boundary sensors are mounted, these additional sensors would provide redundant information and orientation of the vehicle. FIG. 19H shows front and rear mounted boundary sensors 290. With this arrangement, the vehicle can be offset to anywhere within the sensor array.

The configuration in FIG. 19I provides redundant sensors on the left and likewise, the configuration in FIG. 19L provides redundant sensors on the right. FIG. 19K shows the redundant sensors in the centered. The redundant sensors provide vehicle orientation and more robust determination of the boundary. FIG. 19J shows a smaller version of what is shown in FIG. 19A. FIG. 19M shows mounted sensor arrays at different reference heights. There are many other possible configurations such as mounting three boundary sensors instead of two or one boundary sensor on a side.

As shown in FIG. 20A, two boundary sensors 295 and 296 are mounted on a mowing vehicle 160. The mowing vehicle 160 runs autonomously in a field 1215 with the guidance signals from the boundary sensors 295 and 296. On the first pass of the lawn, the boundary sensor 295 detects the edge 1221 which is between the grass field 1215 and another substance such as flower bed, a sidewalk border, a soil barrier, etc. The mowing vehicle 160 turns 180 degrees around when detecting the end of the field and on the second pass, tracks using the boundary sensor 296 where the cut and uncut grass boundary. The mowing vehicle 160 is travelling in the opposite direction. As the mowing vehicle cuts the grass, a new boundary is created. At the end of the field, the mowing vehicle 160 turns 180 degrees and travels in the opposite direction on the newly created boundary with boundary sensor 295. This scenario is repeated until the field is mowed by detecting the opposite edge of the field 1215. Additional sensor inputs to the steering controller 90 can be employed from a magnetic compass, GPS receiver, rate gyro. These additional sensors provide for continued vehicle guidance over areas without any vegetation. The additional sensors can also reduce the tendency of a swerving path in an early pass develop into a major curve in the path. The information is combined from all sensors to maintain a horizontal position estimation of the vehicle. To minimize position error, a complementary filter may be used between the various sensors. Alternatively, a Kalman filter would further enhance accuracy by adaptively tracking noise characteristics from each of the various sensors.

FIG. 20B shows an autonomous mowing vehicle 160 guided by a single boundary sensor 290 to mow the field 1217 in a spiraling configuration. First, the boundary sensor 290 detects the field edge 1221 and guides the mowing vehicle around the field. During the first pass, the autonomous mowing vehicle 160 creates a new cut/uncut grass boundary. Then on second pass and thereafter, the boundary sensor 290 detects the cut/uncut grass boundary. The autonomous mowing vehicle will continue until the grass is mowed.

If a tree or another obstacle 1231 is in the middle of the field 1217 such as illustrated in FIG. 21A, the autonomous mowing vehicle 160 will use the guidance signals from the cut/uncut grass boundary until the boundary sensor detects the edge 1233 around the obstacle. The edge 1233 would be a lower surface than the cut or uncut grass and would be easily distinguished by the boundary sensors 295 and 296. The autonomous mowing vehicle would travel around in a clockwise direction using boundary sensor 296. As more grass is mowed, the autonomous mowing vehicle would use the guidance signal from the boundary sensor 295 in a counterclockwise direction around the obstacle 1231. In FIG. 21B, the grass field 1217 has an obstacle 1231 in the middle of the field. Here, the edge 1235 is in a triangular pattern around the obstacle. In a likewise manner as described earlier, the autonomous mowing vehicle would use the guidance signal from boundary sensor 296 along the edge 1235 and boundary sensor 295 around the triangular pattern. The use of two different patterns around the obstacle 1231 is a matter of appearance of the mowed lawn.

Sensor Integration

In FIG. 22, the mowing vehicle 160 detects the boundary 1535 between the cut 1531 and uncut grass 1532. However, if there is a gap 1533 in the detected boundary, the boundary sensor will detect no boundary and may provide incorrect guidance information to the robotic mower 160. One way to prevent this concern is to use another type of sensor 193 which provides guidance information reduces the weighting of the information from the cut/uncut boundary. Sensor 193 may be any combination of gyroscopic sensors, rate gyros, accelerometers on several axis, compass sensor, GPS sensor or an array of GPS sensors, a vision sensor, a laser guidance system with reflectors or lasers placed about the area of vehicle operation, or other sensors. FIG. 23 shows a method to integrate other sensors 192 and 193 to the boundary sensor 290 to provide a more robust guidance signal 190. The boundary sensor 290 outputs a measurement 52 of the detected boundary and the other sensors 192, and 193, provide additional guidance signals 196 and 198. The signals are combined using a Kalman filter 194 to provide a robust guidance signal 190. These other sensors can be a GPS sensor 160 as shown in FIG. 24A, or a vision sensor 182 with a camera 180 as shown in FIG. 24B. The boundary sensor 290 can be contacting such as FIG. 3A using paddles or a non-contacting sensor such as FIG. 3B which uses distance sensors to detect the same reference boundary. Other navigational sensors can be gyroscopes, accelerometers, compass, guidance wires in the area of operation of the vehicle, RF signals, cell phone signals, Wi-Fi signals, etc.

System

FIG. 25A shows another embodiment of the invention and FIG. 25B show the block diagram of the control system. The semi-autonomous or autonomous vehicle 300 is a riding lawn mower where the front wheels 318 are steered using conventional steering. The operator steering wheel is attached to a sensor 315 such as a rotary encoder or potentiometer. In semi-autonomous mode, the operator controls the steering via the steering wheel through the attached steering sensor 315. The steering sensor 315 is connected to the controller 92 which controls the steering motor 320 and front wheels 318. The throttle lever 312 controls another input sensor which controls the vehicle speed via the controller 92 and throttle servo 322. The brake 316 and clutch 314 are connected to the brake and clutch sensors 318 and 319, respectively, which control the brake servo 324 and clutch servo 326. In the automated mode with the switch 93 set to 'Auto', the sensor assembly 290 controls the vehicle in similar manner as described earlier.

In another embodiment, a walk-behind mower used as the semi-autonomous or autonomous vehicle 340 as shown in FIG. 26A. In the semi-automated mode, the levers 330, 331, and 332 control the manual operation of the modified walk-behind mower. The levers are mechanically coupled to sensors such as linear or rotary potentiometer which input the speed and direction of the mower. FIG. 26B shows the block diagram of the controlled system. The controller 94 inputs information from the sensors and controls the right actuator 334 and left actuator 335 of the mower. The operator can set the desired speed and also, can allow the boundary sensor 290 to control the steering. There can be an operator override whereby a combination of high excursion and rate on the controls 330, 331, or 332, may revert the controller 94 to manual (no use of sensor 240 input) operation. In the autonomous mode, the front boundary sensor assembly 290 controls the actuators and operator is not needed. Similarly, the operator can make a pass around the desired area to be covered or the mower can be set to follow the edge around the vegetation area.

FIG. 27A shows a semi-autonomous or autonomous vehicle controlled via a communication link through antenna 346 or via front boundary sensor assembly 290. In semi-autonomous mode, the transceiver controls the vehicle around the desired area, vegetation, snow, etc. The transceiver can be a PC with Bluetooth, Wi-Fi, Wi-Max, or other communication, a dedicated controller using similar communication means, or a remote controller. In autonomous mode, the sensor assembly 290 controls the vehicle. FIG. 27B shows the block diagram of the system. Here, the additional sensors shown as sensor box 355, such as compass, accelerometer, gyro, laser, ultrasonic sensor, infrared sensors, GPS sensor, vision sensor, obstacle or body proximity detection, and other sensors are integrated with the boundary sensor to provide a safer and more robust system. These sensors can be incorporated in all other embodiments.

FIG. 28 shows the system with PC 900 communicating with the onboard controller 98 for tracking, status, and even controlling. In this configuration, two controllers are used. The controller 98 involves the sensor processing and integration. The controller 99 controls the actuators such as electric motors. The controllers can be dedicated computers, embedded microcontrollers, or integrated circuits. For applications requiring maximum safety, the controllers would contain watchdogs each, which would insure that they were both functional despite environmental disturbances such as electric arcs (lightning, welding, faulty power line systems), and that failure to successfully continue with programmed operation would result in shutdown of primary vehicle system (propulsion and cutting or operations—snowplow) power. The processing watchdog function would also include built in confidence testing of sensors used for all data to the processors. In cases where several sensors combine for vehicle guidance and only one sensor is degraded, a reduced operation—limp home, or other mode may be entered. The system shutdown due to watchdog initiative would be in addition to a system shutdown response in case of sensed foreign obstacle, animal, or unauthorized person approaching the vehicle.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description.

What is claimed and desired to be secured by Letters Patent of the United States is:

1. A guidance apparatus for a semi-autonomous or autonomous vehicle, the guidance apparatus comprising:
   a plurality of non-contacting distance sensors, wherein said sensors are infrared, ultrasonic, capacitance, microwave, or vision, spaced closely together with no moving components directly above two surfaces with a boundary between the two surfaces, wherein the two surfaces comprise a first, relatively higher surface and a second, relatively lower surface, wherein each distance sensor is fixed in a physical orientation with respect to the vehicle and configured to detect the boundary between the two surfaces without movement of the vehicle by measuring a first vertical distance from some of the distance sensors to the first surface and by measuring a second vertical distance from some of the distance sensors to the second surface; and
   a controller electrically connected to the plurality of non-contacting distance sensors and configured to produce one or more guidance signals for said semi-autonomous or autonomous vehicle to steer said semi-autonomous or autonomous vehicle along said boundary detected by said plurality of non-contacting distance sensors.

2. The apparatus of claim 1, wherein the plurality of non-contacting distance sensor comprises:
   a plurality of non-contact distance measuring sensors aligned in a same direction with each sensor having a transmitter and a receiver; and
   a processor electrically connected to the plurality of non-contacting distance measuring sensors and configured to determine which of said non-contacting distance measuring sensors measure said first, relatively higher surface and which of said non-contacting distance measuring sensors measure said second, relatively lower surface.

3. The apparatus of claim 1, wherein the first, relatively higher surface is associated with un-mowed vegetation.

4. The apparatus of claim 1, wherein the second, relatively lower surface is associated with mowed vegetation.

5. The apparatus of claim 1, wherein the second, relatively lower surface is a flower bed, a sidewalk, a barrier, or a lower border.

6. The apparatus of claim 1, wherein the controller is one or more of a microcontroller or an integrated circuit.

7. A guidance apparatus for a semi-autonomous or autonomous vehicle, the guidance apparatus comprising:
   a plurality of rotatable contact members on a rotating shaft;
   a plurality of slip clutches, each slip clutch associated with a contact member coupling said shaft to said contact member in rotating engagement;
   a sensor configured to detect a boundary by detecting impeded rotation of said rotatable contact members relative to said rotating shaft due to slippage of one or more of said slip clutches in response to contact with a relatively higher surface, but not contact with a relatively lower surface, without stoppage of the said rotating shaft; and
   a controller configured to produce one or more guidance signals to steer said semi-autonomous or autonomous vehicle along said boundary detected by said sensor.

8. A semi-autonomous or autonomous mowing vehicle having a body and at least one cutting blade under said body, the mowing vehicle comprising:
   a plurality of non-contacting distance sensor, wherein said sensors are infrared, ultrasonic, capacitance, microwave, or vision, spaced closely together with no moving components directly above two surfaces with a boundary between the two surfaces, wherein the two surfaces comprise a first, relatively higher surface and a second, relatively lower surface, wherein each distance sensor is fixed in a physical orientation with respect to the vehicle and configured to detect the boundary without movement of the vehicle by measuring a first vertical distance from some of the distance sensors to the first surface and by measuring a second vertical distance from some of the distance sensors to the second surface; and
   a controller electrically connected to the plurality of non-contacting distance sensors and configured to produce one or more guidance signals to steer said mowing vehicle along said boundary.

9. The mowing vehicle of claim 8, wherein the plurality of non-contacting distance sensors comprise:
   a plurality of non-contact distance-measuring sensors aligned in a same direction with each sensor having a transmitter and a receiver; and
   a processor electrically connected to the plurality of non-contact distance-measuring sensors and configured to determine which of said non-contact distance-measuring sensors measure said first, relatively higher surface and which of said non-contact distance-measuring sensors measure said second, relatively lower surface.

10. The mowing vehicle of claim 8, wherein the first, relatively higher surface is associated with un-mowed vegetation.

11. The mowing vehicle of claim 8, wherein the second, relatively lower surface is associated with mowed vegetation.

12. The mowing vehicle of claim 8, wherein the second, relatively lower surface is one of a flower bed, a sidewalk, a barrier, or a lower border.

13. The mowing vehicle of claim 8, wherein the controller is one or more of a microcontroller or an integrated circuit.

14. The mowing vehicle of claim 8, wherein said non-contacting distance sensors are integrated with a GPS, DGPS, vision, compass, gyroscope, or other sensor to determine the boundary when a gap in the boundary is present.

15. A semi-autonomous or autonomous mowing vehicle having a body and at least one cutting blade under said body, the mowing vehicle comprising:
   a plurality of rotatable contact members on a rotating shaft;
   a plurality of slip clutches, each slip clutch associated with one of said rotatable contact members, thereby coupling said shaft to a contact member in rotating engagement;

a sensor configured to detect impeded rotation of said rotatable contact members relative to said rotating shaft due to slippage of said clutches in response to contact with a first, relatively higher surface, but not contact with a second, relatively lower surface without stoppage of the rotating shaft; and a controller configured to produce one or more guidance signals to steer said mowing vehicle along said boundary.

16. A method for controlling steering of a vehicle having at least one cutting blade for mowing a field, the method comprising:

measuring, with distance sensors, wherein said sensors are infrared, ultrasonic, capacitance, microwave, or vision, spaced closely together with no moving components that are fixed in a physical orientation with respect to the vehicle, a plurality of vertical distances directly above the vegetation to an approximate top of vegetation in the field so as to result in a respective plurality of measured distances, wherein the plurality of vertical distances comprise a first vertical distance to a relatively higher top level of the vegetation and a second vertical distance to a relatively lower top level of the vegetation, wherein the relatively higher top level is associated with un-mowed vegetation, and the relatively lower top level is associated with mowed vegetation, and wherein the plurality of measured distances are measured at points having known relative positions in a direction that is transverse to the direction of the distances and also generally transverse to a direction in which the vehicle is configured to move across the field during mowing, wherein measuring the plurality of vertical distances is accomplished without contacting the vegetation and comprises transmitting a respective plurality of distance-measuring signals and estimating respective distances based on processing of the distance-measuring signals;

determining, based on the plurality of distances and the known relative positions of the points of distance measurement, an approximate boundary without movement of the vehicle between mowed vegetation and unmowed vegetation; and controlling said vehicle to steer said vehicle based on said boundary.

17. The method of claim 16, wherein the vehicle comprises a plurality of non-contact distance measuring sensors aligned in same direction, wherein each distance measuring sensor has its own transmitting source and receiving source.

* * * * *